(12) United States Patent
Blaettler et al.

(10) Patent No.: US 9,715,343 B2
(45) Date of Patent: *Jul. 25, 2017

(54) MULTIDIMENSIONAL PARTITIONED STORAGE ARRAY AND METHOD UTILIZING INPUT SHIFTERS TO ALLOW MULTIPLE ENTIRE COLUMNS OR ROWS TO BE ACCESSED IN A SINGLE CLOCK CYCLE

(71) Applicant: INTERNATIONAL BUSINESS MACHINES CORPORATION, Armonk, NY (US)

(72) Inventors: Tobias Blaettler, Maur (CH); Charles J. Camp, Sugar Land, TX (US); Thomas Parnell, Zürich (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/051,059

(22) Filed: Feb. 23, 2016

(65) Prior Publication Data

US 2016/0170661 A1 Jun. 16, 2016

Related U.S. Application Data

(63) Continuation-in-part of application No. 14/100,883, filed on Dec. 9, 2013, now Pat. No. 9,442,661.

(51) Int. Cl.
*G06F 3/06* (2006.01)
*G06F 12/00* (2006.01)
(Continued)

(52) U.S. Cl.
CPC .......... *G06F 3/0613* (2013.01); *G06F 3/0619* (2013.01); *G06F 3/0638* (2013.01);
(Continued)

(58) Field of Classification Search
CPC .... G06F 3/0613; G06F 3/0619; G06F 3/0638; G06F 3/0665; G06F 3/0689; G06F 11/14; G06F 7/785; G06G 3/0644
See application file for complete search history.

(56) References Cited

U.S. PATENT DOCUMENTS 4,094,009 A 6/1978 Schneider et al.
4,164,031 A 8/1979 Lou et al.
(Continued)

FOREIGN PATENT DOCUMENTS

CN 101227195 A 7/2008

*Primary Examiner* — Mark Giardino, Jr.
*Assistant Examiner* — Glenn Gossage
(74) *Attorney, Agent, or Firm* — Matthew C. Zehrer

(57) ABSTRACT

A multidimensional storage array (SA) system includes storage elements (SEs) arranged in storage array partitions, a plurality of input shifters, and a plurality of output shifters. One respective input shifter and output shifter is associated with one partition. The SEs are arranged into rows and columns and each store particular bit(s) of a data word. Each of the input shifters implements a positional shift to a data word that is then loaded to the associated partition. Each of the output shifters unloads a loaded data word, reverses the positional shift of the unloaded data word, and provides the data word to a requesting device, such as a decoder. The loaded data words are exposed so that multiple row or column addressed data words may be unloaded from the SA simultaneously in a single clock cycle. Multiple column or row address data word segments may be physically diagonally arranged within each storage array partition.

20 Claims, 22 Drawing Sheets

(51) Int. Cl.
*G06F 11/14* (2006.01)
*G06F 7/78* (2006.01)

(52) U.S. Cl.
CPC .......... *G06F 3/0644* (2013.01); *G06F 3/0689* (2013.01); *G06F 11/14* (2013.01); *G06F 7/785* (2013.01)

(56) References Cited

U.S. PATENT DOCUMENTS

| | | |
|---|---|---|
| 4,667,308 A | 5/1987 | Hayes et al. |
| 4,799,149 A | 1/1989 | Wolf |
| 5,490,264 A | 2/1996 | Wells et al. |
| 5,668,772 A | 9/1997 | Hotta |
| 8,433,976 B1 | 4/2013 | Demirsoy |
| 8,493,912 B2 | 7/2013 | Ko et al. |
| 2006/0218341 A1 | 9/2006 | Nolte et al. |
| 2010/0077176 A1 | 3/2010 | Pearlstein et al. |

FIG. 18A

| | | | | | | | | | | | |
|---|---|---|---|---|---|---|---|---|---|---|---|
| R8.C11 | R8.C10 | R8.C9 | R8.C8 | R8.C7 | R8.C6 | R8.C5 | R8.C4 | R8.C3 | R8.C2 | R8.C1 | R8.C0 |
| R9.C11 | R9.C10 | R9.C9 | R9.C8 | R9.C7 | R9.C6 | R9.C5 | R9.C4 | R9.C3 | R9.C2 | R9.C1 | R9.C0 |
| R10.C11 | R10.C10 | R10.C9 | R10.C8 | R10.C7 | R10.C6 | R10.C5 | R10.C4 | R10.C3 | R10.C2 | R10.C1 | R10.C0 |
| R11.C11 | R11.C10 | R11.C9 | R11.C8 | R11.C7 | R11.C6 | R11.C5 | R11.C4 | R11.C3 | R11.C2 | R11.C1 | R11.C0 |

FIG. 18B

| R4.C3 | R4.C2 | R4.C1 | R4.C0 | R4.C11 | R4.C10 | R4.C9 | R4.C8 | R4.C7 | R4.C6 | R4.C5 | R4.C4 |
|---|---|---|---|---|---|---|---|---|---|---|---|
| R5.C3 | R5.C2 | R5.C1 | R5.C0 | R5.C11 | R5.C10 | R5.C9 | R5.C8 | R5.C7 | R5.C6 | R5.C5 | R5.C4 |
| R6.C3 | R6.C2 | R6.C1 | R6.C0 | R6.C11 | R6.C10 | R6.C9 | R6.C8 | R6.C7 | R6.C6 | R6.C5 | R6.C4 |
| R7.C3 | R7.C2 | R7.C1 | R7.C0 | R7.C11 | R7.C10 | R7.C9 | R7.C8 | R7.C7 | R7.C6 | R7.C5 | R7.C4 |
| R8.C11 | R8.C10 | R8.C9 | R8.C8 | R8.C7 | R8.C6 | R8.C5 | R8.C4 | R8.C3 | R8.C2 | R8.C1 | R8.C0 |
| R9.C11 | R9.C10 | R9.C9 | R9.C8 | R9.C7 | R9.C6 | R9.C5 | R9.C4 | R9.C3 | R9.C2 | R9.C1 | R9.C0 |
| R10.C11 | R10.C10 | R10.C9 | R10.C8 | R10.C7 | R10.C6 | R10.C5 | R10.C4 | R10.C3 | R10.C2 | R10.C1 | R10.C0 |
| R11.C11 | R11.C10 | R11.C9 | R11.C8 | R11.C7 | R11.C6 | R11.C5 | R11.C4 | R11.C3 | R11.C2 | R11.C1 | R11.C0 |

FIG. 18C

| R0.C7 | R0.C6 | R0.C5 | R0.C4 | R0.C3 | R0.C2 | R0.C1 | R0.C0 | R0.C11 | R0.C10 | R0.C9 | R0.C8 |
|---|---|---|---|---|---|---|---|---|---|---|---|
| R1.C7 | R1.C6 | R1.C5 | R1.C4 | R1.C3 | R1.C2 | R1.C1 | R1.C0 | R1.C11 | R1.C10 | R1.C9 | R1.C8 |
| R2.C7 | R2.C6 | R2.C5 | R2.C4 | R2.C3 | R2.C2 | R2.C1 | R2.C0 | R2.C11 | R2.C10 | R2.C9 | R2.C8 |
| R3.C7 | R3.C6 | R3.C5 | R3.C4 | R3.C3 | R3.C2 | R3.C1 | R3.C0 | R3.C11 | R3.C10 | R3.C9 | R3.C8 |
| R4.C3 | R4.C2 | R4.C1 | R4.C0 | R4.C11 | R4.C10 | R4.C9 | R4.C8 | R4.C7 | R4.C6 | R4.C5 | R4.C4 |
| R5.C3 | R5.C2 | R5.C1 | R5.C0 | R5.C11 | R5.C10 | R5.C9 | R5.C8 | R5.C7 | R5.C6 | R5.C5 | R5.C4 |
| R6.C3 | R6.C2 | R6.C1 | R6.C0 | R6.C11 | R6.C10 | R6.C9 | R6.C8 | R6.C7 | R6.C6 | R6.C5 | R6.C4 |
| R7.C3 | R7.C2 | R7.C1 | R7.C0 | R7.C11 | R7.C10 | R7.C9 | R7.C8 | R7.C7 | R7.C6 | R7.C5 | R7.C4 |
| R8.C11 | R8.C10 | R8.C9 | R8.C8 | R8.C7 | R8.C6 | R8.C5 | R8.C4 | R8.C3 | R8.C2 | R8.C1 | R8.C0 |
| R9.C11 | R9.C10 | R9.C9 | R9.C8 | R9.C7 | R9.C6 | R9.C5 | R9.C4 | R9.C3 | R9.C2 | R9.C1 | R9.C0 |
| R10.C11 | R10.C10 | R10.C9 | R10.C8 | R10.C7 | R10.C6 | R10.C5 | R10.C4 | R10.C3 | R10.C2 | R10.C1 | R10.C0 |
| R11.C11 | R11.C10 | R11.C9 | R11.C8 | R11.C7 | R11.C6 | R11.C5 | R11.C4 | R11.C3 | R11.C2 | R11.C1 | R11.C0 |

MULTIDIMENSIONAL PARTITIONED STORAGE ARRAY AND METHOD UTILIZING INPUT SHIFTERS TO ALLOW MULTIPLE ENTIRE COLUMNS OR ROWS TO BE ACCESSED IN A SINGLE CLOCK CYCLE

RELATED APPLICATIONS

This application is a continuation-in-part of commonly owned co-pending application Ser. No. 14/100,883, now U.S. Pat. No. 9,442,661, entitled, "MULTIDIMENSIONAL STORAGE ARRAY AND METHOD UTILIZING AN INPUT SHIFTER TO ALLOW AN ENTIRE COLUMN OR ROW TO BE ACCESSED IN A SINGLE CLOCK CYCLE."

FIELD

Embodiments of the present invention generally relate to storage systems and storage devices, and more particularly to a multidimensional storage array and method utilizing an input shifter and output shifter to allow multiple column addressed data words or multiple row addressed data words to be accessed in a single clock cycle.

DESCRIPTION OF THE RELATED ART

Storage controllers, microprocessors, and other data processing devices often operate on data organized as an array of multiple rows and columns—a multidimensional storage array. In various applications, it may be desirable to access data corresponding to a particular row or access data corresponding to a particular column. One exemplary application may be iterative error correction schemes, e.g. Turbo Codes, etc. for modern Flash memory devices that exhibit errors when data is retrieved from the memory devices. These error correction techniques often require data to be processed as a two dimensional array with high-speed access to both rows and columns. To deliver high performance, the processing of data in multiple dimensions requires that the data be transposed with low overhead. However, traditional access techniques, e.g. storing the data in a traditional random access memory device, do not deliver the level of throughput required for correcting data at high bandwidths.

SUMMARY

In a first embodiment of the present invention, a multidimensional storage array system includes a multidimensional storage array, multiple storage array partitions, multiple input shifters, an input and output interface, multiple output shifters, and a decoder. The multidimensional storage array includes a plurality of storage elements physically arranged in a plurality of rows and a plurality of columns that each store particular bit(s) of a data word and a plurality of storage array partitions each including a plurality of rows with each row including a plurality of row orientated storage elements. Each input shifter is associated with a unique storage array partition and implements a shift upon received data words and serially loads the shifted data words to the associated storage array partition via the storage array input interface filling the multidimensional storage array with multiple row addressed data words and multiple column addressed data words. The column addressed data word segments and row addressed data words are exposed within each storage array partition. Shifted data words are unloaded from the multidimensional storage array by the storage array output interface. Each of the output shifters is associated with a unique storage array partition and unloads from an associated partition and reverses the shift of a requested row addressed data word and unloads from the associated partition and reverses the shift of a plurality of column addressed data word segments associated with a requested column addressed data word. Multiple requested row addressed data words are unloaded by the plurality of output shifters simultaneously in a single clock cycle and multiple requested column addressed data words are unloaded by the plurality of output shifters simultaneously in a subsequent single clock cycle. The decoder requests and receives the multiple requested row addressed data words and the multiple requested column addressed data words from the plurality of output shifters, corrects an error within the multiple requested row addressed data words and the multiple requested column addressed data words, and returns the corrected multiple requested row addressed data words and the corrected multiple requested column addressed data words to the plurality of input shifters. The decoder iteratively requests and returns all row addressed data words within the multidimensional storage array and subsequently requests and returns all column addressed data words within the multidimensional storage array.

In another embodiment of the present invention, a multidimensional storage array system includes a multidimensional storage array, multiple storage array partitions, multiple input shifters, an input and output interface, multiple output shifters, and a decoder. The multidimensional storage array includes a plurality of storage elements physically arranged in a plurality of rows and a plurality of columns that each store particular bit(s) of a data word and a plurality of storage array partitions each including a plurality of columns with each column including a plurality of column orientated storage elements. Each input shifter is associated with a unique storage array partition and implements a shift upon received data words and serially loads the shifted data words to the associated storage array partition via the storage array input interface filling the multidimensional storage array with multiple row addressed data words and multiple column addressed data words. Row addressed data word segments and column addressed data words are exposed within each storage array partition. Shifted data words are unloaded from the multidimensional storage array by the storage array output interface. Each of the output shifters is associated with a unique storage array partition and unloads from an associated partition and reverses the shift of a requested column addressed data word and unloads from the associated partition and reverses the shift of a plurality of row addressed data word segments associated with a requested row addressed data word. Multiple requested column addressed data words are unloaded by the plurality of output shifters simultaneously in a single clock cycle and multiple requested row addressed data words are unloaded by the plurality of output shifters simultaneously in a subsequent single clock cycle. The decoder requests and receives the multiple requested column addressed data words and the multiple requested row addressed data words from the plurality of output shifters, corrects an error within the multiple requested column addressed data words and the multiple requested row addressed data words, and returns the corrected multiple requested column addressed data words and the corrected multiple requested row addressed data words to the plurality of input shifters. The decoder iteratively requests and returns all column addressed data words within the multidimensional storage array and subsequently requests and returns all row addressed data words within the multidimensional storage array.

In yet another embodiment of the present invention, a multidimensional storage array access method includes iteratively receiving, with a plurality of input shifters, a plurality of data words simultaneously in a single clock cycle, shifting, with each input shifter, a received first iteration data word by zero positions and shifting a received second iteration data word by a number of positions equal to a number of storage array partitions, loading, with each input shifter, the shifted iteratively received data words to a multidimensional storage array via a storage array input interface filling the multidimensional storage array with multiple row addressed data words and multiple column addressed data words, unloading, to a plurality of output shifters, multiple requested row addressed data words or multiple requested column addressed data word segments simultaneously in a single clock cycle, each output shifter is associated with a unique storage array partition and unloads from an associated partition and reverses the shift of a requested row addressed data word or unloads from the associated partition and reverses the shift a plurality of column addressed data word segments associated with a requested column addressed data word, receiving, with a decoder, the multiple requested row addressed data words or multiple requested column addressed data words simultaneously in a single clock cycle, correcting, with the decoder, an error within the multiple requested row addressed data words or multiple requested column addressed data words, and returning, with the decoder, the corrected multiple requested row addressed data words or corrected multiple requested column addressed data words to the plurality of input shifters, wherein the decoder iteratively requests and returns all row addressed data words within the multidimensional storage array and subsequently requests and returns all column addressed data words within the multidimensional storage array. The multidimensional storage array includes a plurality of storage elements physically arranged in a plurality of rows and a plurality of columns and a plurality of storage array partitions. Each storage array partition includes a plurality of rows and each row comprises a plurality of row orientated storage elements. Each input shifter loads the shifted iteratively received data words to a particular associated partition. The column addressed data word segments and row addressed data words are exposed within each storage array partition.

These and other embodiments, features, aspects, and advantages will become better understood with reference to the following description, appended claims, and accompanying drawings.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 18A-FIG. 18C depict the loading of multiple row addressed data words into the multidimensional storage array at each incremental clock cycle, according to embodiments of the present invention.

DETAILED DESCRIPTION

Figure 1:
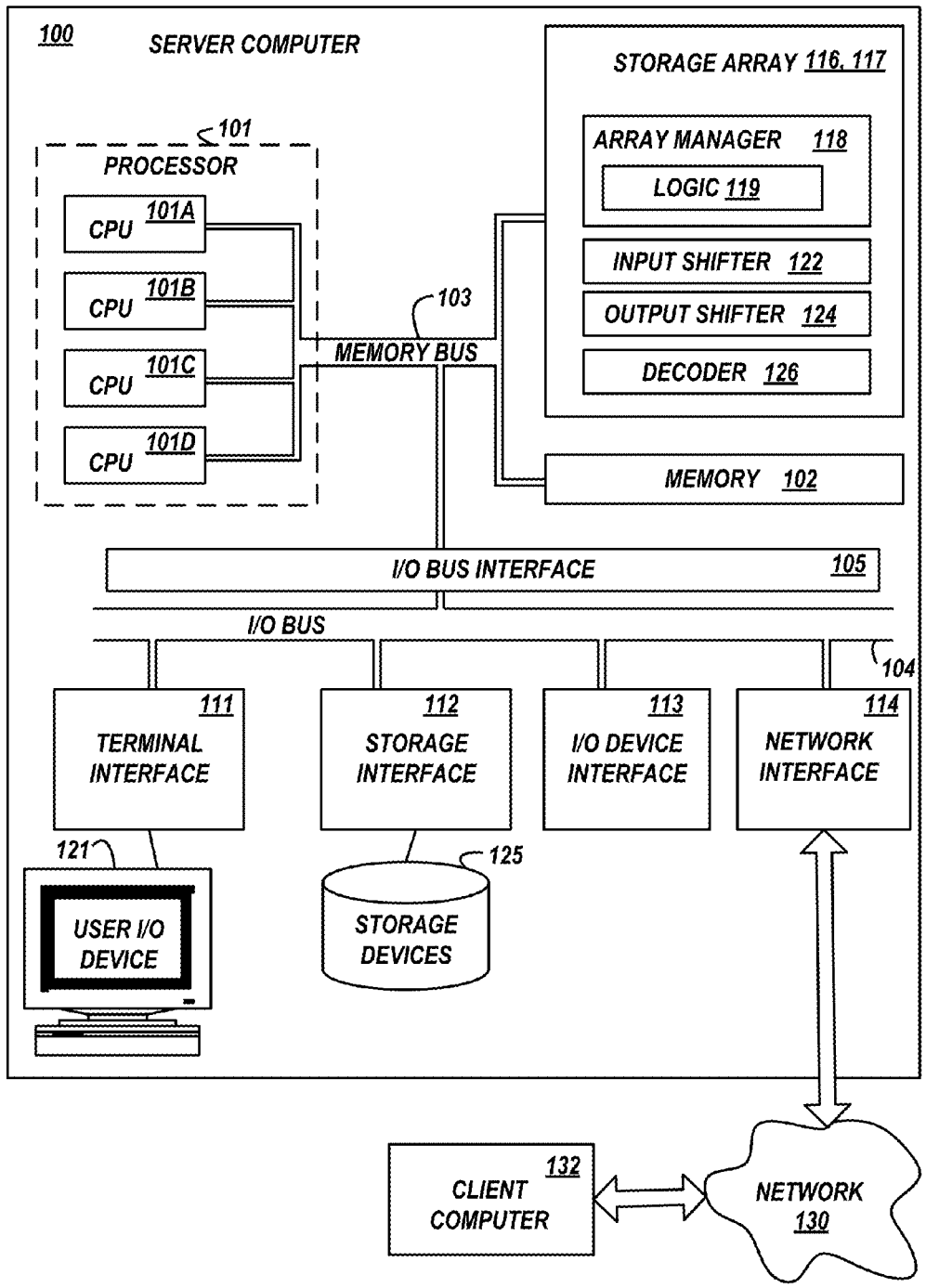
FIG. 1 depicts an exemplary data handling system, according to various embodiments of the present invention.

Details of the claimed embodiments are disclosed herein. However, it is understood that the disclosed embodiments are merely illustrative of the structures, devices, systems, methods, etc. that may be embodied in various forms. These exemplary embodiments are provided so that this disclosure will be thorough and complete and will convey the scope of this invention to those skilled in the art. In the description, details of well-known features and techniques may be omitted to avoid unnecessarily obscuring the presented embodiments.

Accordingly, aspects of the present invention may take the form of an entirely hardware embodiment, an entirely software embodiment (including firmware, resident software, micro-code, etc.) or an embodiment combining software and hardware aspects that may all generally be referred to herein as a "device," "manager" or "system." Furthermore, aspects of the present invention may take the form of a computer program product embodied in one or more computer readable medium(s) having computer readable program code embodied thereon. Any combination of one or more computer readable medium(s) may be utilized.

The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, etc., or any suitable combination of the foregoing.

Computer program code for carrying out operations for aspects of the present invention may be written in any combination of one or more programming languages, including an object oriented programming language such as Java®, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider (ISP)). Additionally, the code for carrying out operations for various embodiments of the present invention may be written in a hardware description language such as Verilog or VHDL, and may be compiled to a field programmable gate array (FPGA), application-specific integrated circuit (ASIC), full custom semiconductor device, or any other hardware device capable of implementing the operations described by the hardware description language. The code may also be written in a combination of a software programming language and a hardware description language, with various aspects of an implementation being handled by software and hardware.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the functions/acts specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The drawings are not necessarily to scale. The drawings are merely schematic representations, not intended to portray specific parameters of the invention. The drawings are intended to depict only exemplary embodiments of the invention. In the drawings, like numbering represents like elements.

FIG. 1 depicts an exemplary data handling system, according to various embodiments of the present invention. For example, FIG. 1 depicts a high-level block diagram representation of a server computer 100 connected to a client computer 132 via a network 130. The term "server" is used herein for convenience only, and in various embodiments a computer system that operates as a client computer in one environment may operate as a server computer in another environment, and vice versa. The mechanisms and apparatus of embodiments of the present invention apply equally to any appropriate computing system.

The computer 100 may include one or more processors 101, a memory 102, a terminal interface 111, a storage interface 112, an I/O (Input/Output) device interface 113, a network adapter or interface 114, and/or a multidimensional storage array 116, 117, all of which are communicatively coupled, directly or indirectly, for inter-component communication via a memory bus 103, an I/O bus 104, and an I/O bus interface 105.

The computer 100 may contain one or more general-purpose programmable central processing units (CPUs) 101A, 101B, 101C, and 101D, herein generically referred to as processor 101. In an embodiment, the computer 100 contains multiple processors typical of a relatively large system; however, in another embodiment the computer 100 may alternatively be a single CPU system. Each processor 101 may execute instructions stored in the memory 102 and/or stored in storage array 116, 117 and may comprise one or more levels of on-board cache.

In an embodiment, the memory 102 may comprise a random-access semiconductor memory, storage device, or storage medium for storing or encoding data and programs. In another embodiment, the memory 102 represents the entire virtual memory of the computer 100, and may also include the virtual memory of other computer systems coupled to the computer 100 or connected via the network 130. The memory 102 is conceptually a single monolithic entity, but in other embodiments the memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

In an embodiment, storage array 116, 117 may comprise a multidimensional array in which data may be organized into multiple rows and columns. In various implementations, where data is to be accessed from the storage array 116, 117 faster than traditional memory technologies. For example, storage array 116, 117 may be a FPGA, ASIC or other custom integrated circuit, etc. Generally, storage array 116, 117 may be a storage device that stores wide, very wide, etc. data words within the multidimensional array.

In certain embodiments storage array 116, 117 is included in storage device 125 that may be accessed by processor 101 via, e.g. storage interface 112 and/or included in a storage system that may be accessed by computer 100 via, e.g. network 130, etc.

In certain embodiments, storage array 116, 117 includes an array manager 118 that manages accessing data to or from storage array 116, 117. Array manager 118 may be a physical hardware component (e.g. semiconductor devices, chips, logical gates, circuits, etc.) of the FPGA, ASIC, or custom IC and/or a management routine (e.g. logic 119, etc.) that is executed by the FPGA, ASIC, custom IC, processor 101, etc. to carry out the functions as further described below. In certain embodiments, storage array 116, 117 includes one or more input shifter 122 and one or more output shifter 124 to carry out the functions as further described below. Though shown as conceptually distinct entities, in some implementations, the input shifter(s) 122 and output shifter(s) 124 may be a single entity. Further, in certain embodiments, storage array 116, 117 may include one or more error correction code devices (e.g. decoder 126, encoder, etc.) or logic module for performing error correction upon the data stored in the storage array 116, 117.

Though shown as components of storage array 116, 117, in certain embodiments, array manager 118, input shifter 122, output shifter 124, etc. may be distinct from storage array 116, 117 and included in other devices in communication with storage array 116, 117. For example, in certain embodiments array manager 118 may be a distinct ASIC, FPGA, etc. in communication with storage array 116, 117. In certain other embodiments, the functionality of array manager 118, input shifter 122, output shifter 124, etc. may be carried out by processor 101, etc.

The memory bus 103 provides a data communication path for transferring data among the processor 101, the memory 102, the storage array 116, 117, and the I/O bus interface 105. The I/O bus interface 105 is further coupled to the system I/O bus 104 for transferring data to and from the various I/O units. The I/O bus interface 105 communicates with multiple I/O interface units 111, 112, 113, and 114, which are also known as I/O processors (IOPs) or I/O adapters (IOAs), through the system I/O bus 104.

The I/O interface units support communication with a variety of storage and I/O devices. For example, the terminal interface unit 111 supports the attachment of one or more user I/O devices 121, which may comprise user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 121 and the computer 100, and may receive output data via the user output devices. For example, a user interface may be presented via the user I/O device 121, such as displayed on a display device, played via a speaker, or printed via a printer.

The storage interface unit 112 supports the attachment of one or more disk drives or direct access storage devices 125 (e.g. rotating magnetic disk drive storage devices, arrays of disk drives configured to appear as a single large storage device to a host computer, Flash memory storage devices, etc.). In another embodiment, the storage devices 125 may be implemented as any type of secondary storage device. The contents of the memory 102 and/or storage array 116, 117, or any portion thereof, may be stored to and retrieved from the storage device 125, as needed. The I/O device interface 113 provides an interface to any of various other input/output devices or devices of other types, such as printers or fax machines. The network adapter or interface 114 provides one or more communications paths from the computer 100 to other digital devices; such paths may comprise, e.g., one or more networks 130.

Although the memory bus 103 is shown in FIG. 1 as a relatively simple, single bus structure providing a direct communication path among the processors 101, the memory 102, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 105 and the I/O bus 104 are shown as single respective units, the computer 100 may, in fact, contain multiple I/O bus interfaces 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

In various embodiments, the computer 100 is a multi-user mainframe computer system, a single-user system, or a server computer or similar device that has little or no direct user interface, but receives requests from other computer systems (clients). In other embodiments, the computer 100 is implemented as a desktop computer, portable computer, laptop or notebook computer, tablet computer, pocket computer, telephone, smart phone, pager, automobile, teleconferencing system, appliance, or any other appropriate type of electronic device.

The network 130 may be any suitable network or combination of networks and may support any appropriate protocol suitable for communication of data and/or code to/from the computer 100 to other digital devices. In various embodiments, the network 130 may represent a storage device or a combination of storage devices, either connected directly or indirectly to the computer 100. In another embodiment, the network 130 may support wireless communications. In another embodiment, the network 130 may support hard-wired communications, such as a telephone line or cable. In another embodiment, the network 130 may be the Internet and may support IP (Internet Protocol). In another embodiment, the network 130 is implemented as a local area network (LAN) or a wide area network (WAN). In another embodiment, the network 130 is implemented as a hotspot service provider network. In another embodiment, the network 130 is implemented an intranet. In another embodiment, the network 130 is implemented as any appropriate cellular data network, cell-based radio network technology, or wireless network. In another embodiment, the network 130 is implemented as any suitable network or combination of networks. Although one network 130 is shown, in other embodiments any number of networks (of the same or different types) may be present.

The client computer 132 may comprise some or all of the hardware and computer program elements of the server computer 100. The client computer 132 may also comprise additional elements not illustrated for the server computer 100.

FIG. 1 is intended to depict representative components of the server computer 100, the network 130, and the client computer 132. But, individual components may have greater complexity than represented in FIG. 1, components other than or in addition to those shown in FIG. 1 may be present, and the number, type, and configuration of such components may vary. Several particular examples of such additional complexity or additional variations are disclosed herein; these are by way of example only and are not necessarily the only such variations. The various program components illustrated in FIG. 1 and implementing various embodiments of the invention may be implemented in a number of manners, including using various computer applications, routines, components, programs, objects, modules, data structures, etc., and are referred to hereinafter as "computer programs," or simply "programs."

In addition, various programs described hereinafter may be identified based upon the application for which they are implemented in a specific embodiment of the invention. But, any particular program nomenclature that follows is used merely for convenience, and thus embodiments of the invention are not limited to use solely in any specific application identified and/or implied by such nomenclature. The exemplary environments illustrated in FIG. 1 are not intended to limit the present invention. Indeed, other alternative hardware and/or program environments may be used without departing from the scope of embodiments of the invention.

Figure 2:
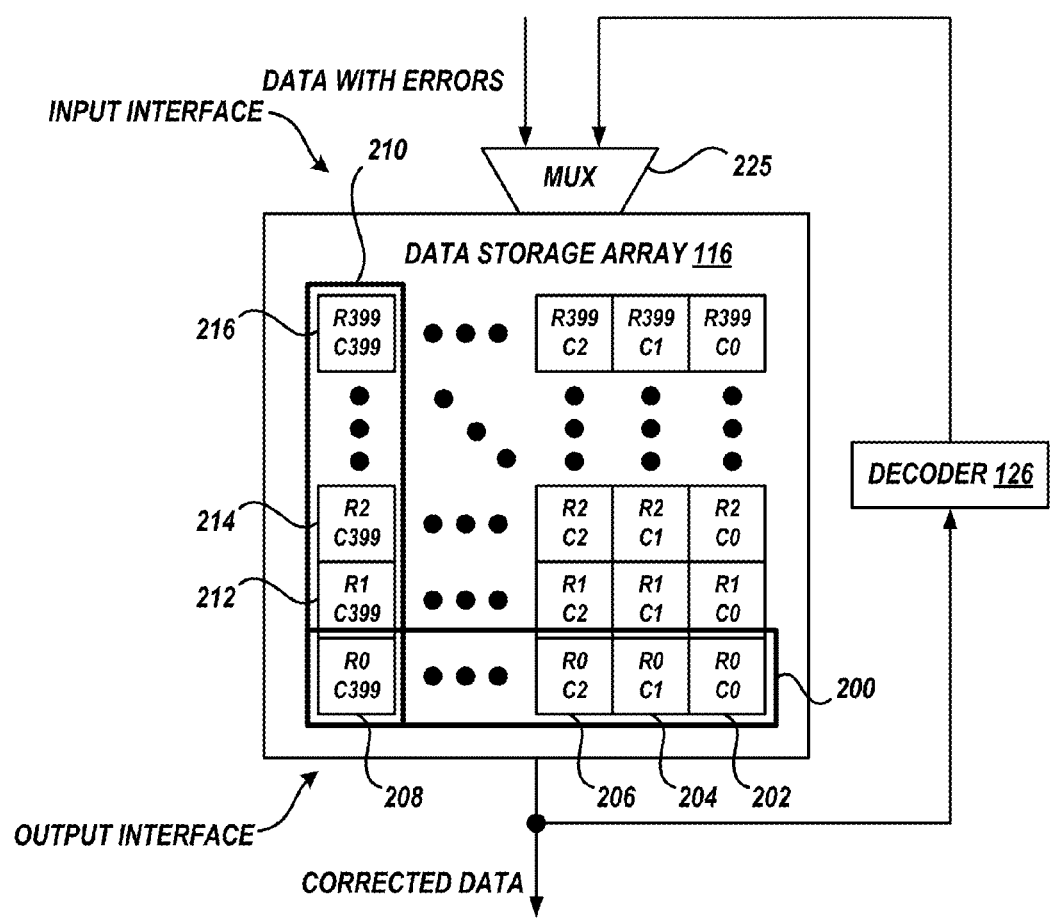
FIG. 2 depicts an exemplary multidimensional storage array including horizontal and vertical data words.

FIG. 2 depicts an exemplary multidimensional storage array 116 including row addressed and/or column addressed data words that are physically arranged as horizontal and vertical data words. Storage array 116 may comprise a multidimensional array in which storage elements that store data may be organized into multiple rows and columns. The storage array 116 may include a plurality of storage elements 202, 204, 206, 208, 212, 214, 216, etc. that store data. The storage elements may be arranged such that some of the storage elements 202, 204, 206, and 208 together store a row or horizontally arranged orientated data word addressed by a row (e.g, R0, etc.) and some of the storage elements 208, 212, 214, and 216 together store a column or vertically orientated data word addressed by a column (e.g., C399, etc.). Data stored addressed by row R0 forms a horizontally arranged row addressed data word 200 and data addressed by C399 forms a vertically arranged column addressed data word 210. In certain embodiments, as shown in FIG. 2, data word 200 may be orthogonally arranged to data word 210. Each storage element may have a unique address made up of a physical row identifier and a physical column identifier. Though shown having 400 rows and 400 columns, storage array 116 may include greater or fewer rows and columns as appropriate. Generally, embodiments of the present invention are advantageously utilized when the number of rows and columns are large, making traditional memories (e.g. DRAM, etc.) inefficient.

In various embodiments of the present invention, a single data bit may be stored within an individual storage element. However, in other embodiments, multiple data bits or bytes may be stored within an individual storage element. For example, a particular storage element may be able to store 8 bytes of data.

In certain embodiments, data words may be unloaded from storage array 116 and fed to a requesting device in quantities of single rows or columns. For example, in high performance applications, a row or column respectively is fed to the requesting device in its entirety during a single hardware clock cycle.

In traditional data arrays, if data is organized to read data physically arranged in rows, then access to data physically arranged in the orthogonal dimension is inefficient. For example, if data is organized to efficiently read vertically arranged data words, access to the horizontally arranged data words is inefficient, such that reading of the horizontally arranged data words would necessitate numerous clock cycles. For example, data array 116 may be arranged for efficient horizontally arranged data word access where data word 200 may be accessed in a single hardware clock cycle. However, to access data word 210, multiple clock cycles would be needed. Multiple clock cycles would be needed since only storage element 208 is exposed to the output interface of storage array 116. In other words, multiple clock cycles are needed to transfer the data in data word 210 to storage element 208 so that the data is exposed to the output interface. Thus, it is an object of the various embodiments of the present invention to improve the efficiency of loading and unloading data words organized in multiple dimensions.

In certain embodiments, storage array 116 is populated from a Flash memory device. For example, storage array 116 may be loaded with data retrieved from a NAND flash storage device, a Solid State Drive (SSD) device, etc. In certain embodiments, data unloaded from storage array 116 may be delivered to a requesting device, e.g. a decoder 126. For example, in a particular error correction scheme where row addressed and column addressed data words are singularly unloaded from storage array 116, each row addressed data word in storage array 116 is fed to decoder 126 in a single clock cycle, corrected (if needed) by decoder 126, and returned to the array with corrections. After each row has been processed by decoder 126, each column is likewise iteratively fed to decoder 126. Correction of all errors may require several iterations of row and column decoding. In certain other embodiments, storage array 116 may be populated by processor 101 and the requesting device may also be processor 101.

In certain embodiments a multiplexer 225 may be utilized to select one of several data words and forward the selected data word to the array 116. For example, multiplexer 225 may select either data words from an a upstream device (such data words may contain errors) or decoded data words from decoder 126 and forward the selected data words array 116, as shown in FIG. 2, or to input shifter 122, as shown in FIG. 4, etc.

In various embodiments, storage array 116 may be comprised within a NAND flash storage device 125, comprised within a storage controller device that resides within NAND flash storage device 125, etc.

Figure 3:
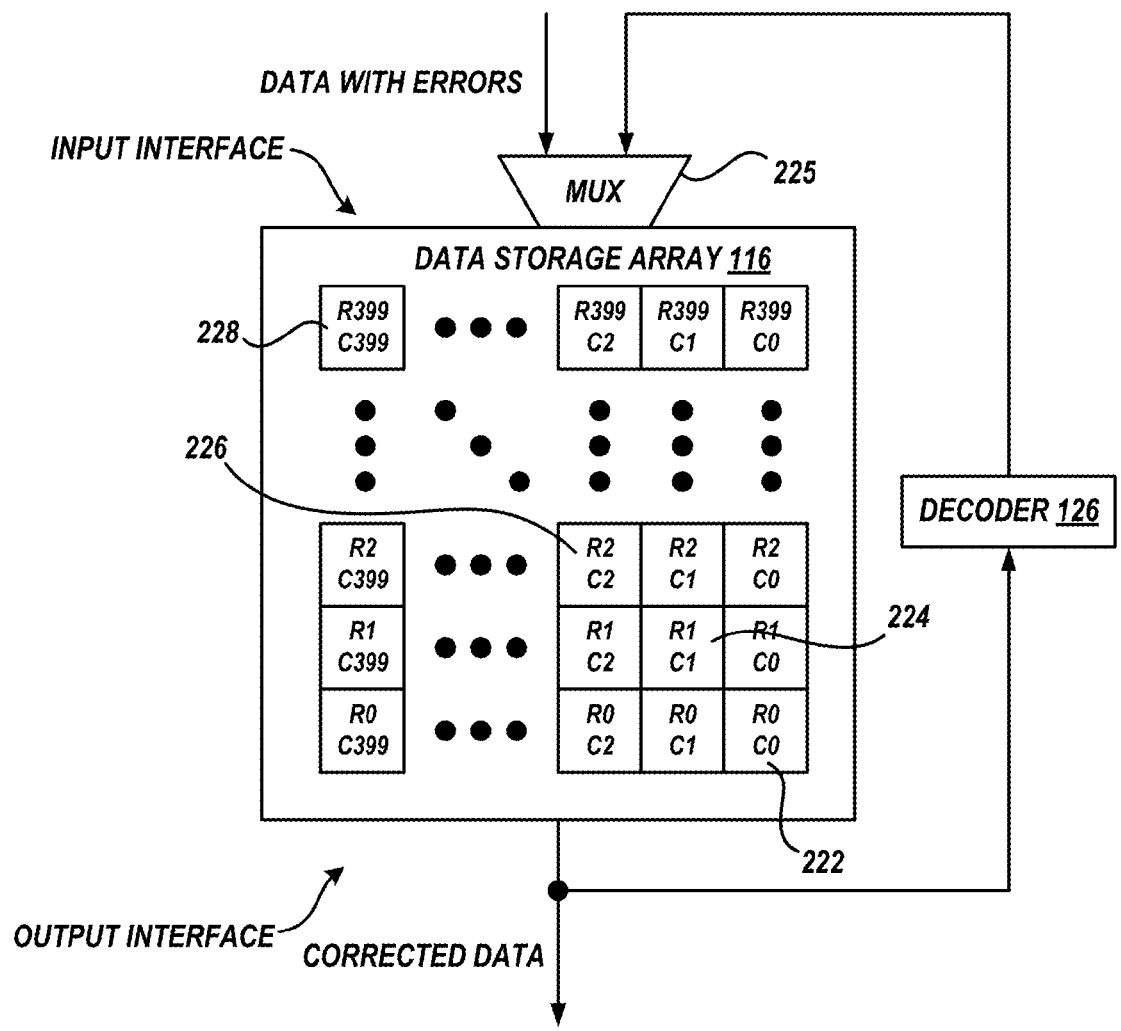
FIG. 3 depicts an exemplary multidimensional storage array including a diagonal data word.

FIG. 3 depicts an exemplary multidimensional storage array 116 including a diagonally arranged data word. In certain embodiments, storage array 116 may include multiple storage elements, such as storage elements 222, 224, 226, 228, etc. A cluster of storage elements (e.g. storage elements physically arranged in a column, etc.) are independently addressable. Unless otherwise indicated herein, an independently addressable cluster means that data from only one physical storage element within the cluster is provided from the cluster in any particular clock cycle. Generally, when array 116 is configured for efficient row addressed data word access, the independently addressable clusters are generally physically vertically arranged. In other words, each column within array 116 is an independently addressable cluster. When array 116 is configured for efficient column addressed data word access, the independently addressable clusters are generally physically horizontally arranged. In other words, each row within the array 116 is an independently addressable cluster.

Figure 4:
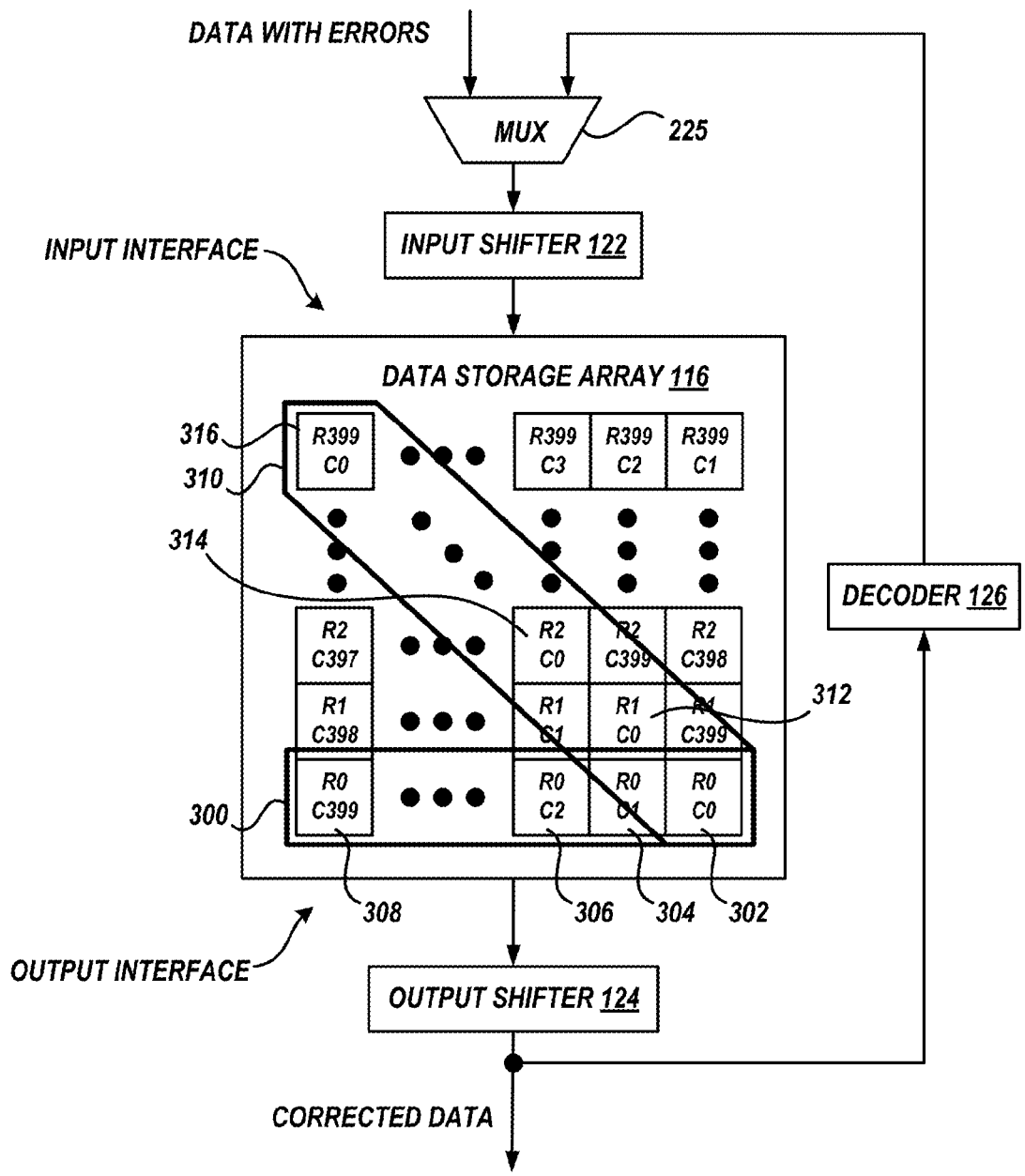
FIG. 4 and FIG. 5 depict exemplary multidimensional storage arrays including an input shifter and output shifter, according to various embodiments of the present invention.

FIG. 4 depict exemplary multidimensional storage array 116 including an input shifter 122 and output shifter 124, according to various embodiments of the present invention. In certain embodiments, data entering array 116 is shifted by input shifter 122 and data exiting storage array 116 is shifted by output shifter 124. In certain embodiments, input shifter 122 may implement a circular shift, bitwise rotation, variable length serial shift, etc.

In certain embodiments, storage array 116 may comprise input shifter 122, output shifter 124, and storage elements that are arranged in an independently addressable cluster to achieve efficient access of multidimensional data words. For example, the storage array 116 may include a plurality of storage elements 302, 304, 306, 308, 312, 314, 316, etc. that together store data. The storage elements may be arranged such that the storage elements 302, 304, 306, and 308 store a row addressed data word (i.e., identified by R0) and some of the storage elements 302, 312, 314, and 316 are arranged to store a column addressed data word (i.e. identified by C0). The data word identified by R0 forms data word 300 that is physically horizontally arranged and the data word identified by C0 forms data word 310 that is physically diagonally arranged.

In certain embodiments, the data entering storage array 116 is shifted by input shifter 122 to expose each storage element of any particular row addressed data word or any particular column addressed data word to the output interface. In the context of unloading an single row addressed data word or column addressed data word in a single clock cycle associated with storage array 116 with a single output shifting element (such as output shifter 124 shown in FIG. 5), the term expose, or the like, means that the storage elements that store any particular circularly shifted data word are physically located in a unique cluster. For example, any particular circularly shifted data word is physically located in a unique column.

Figure 5:
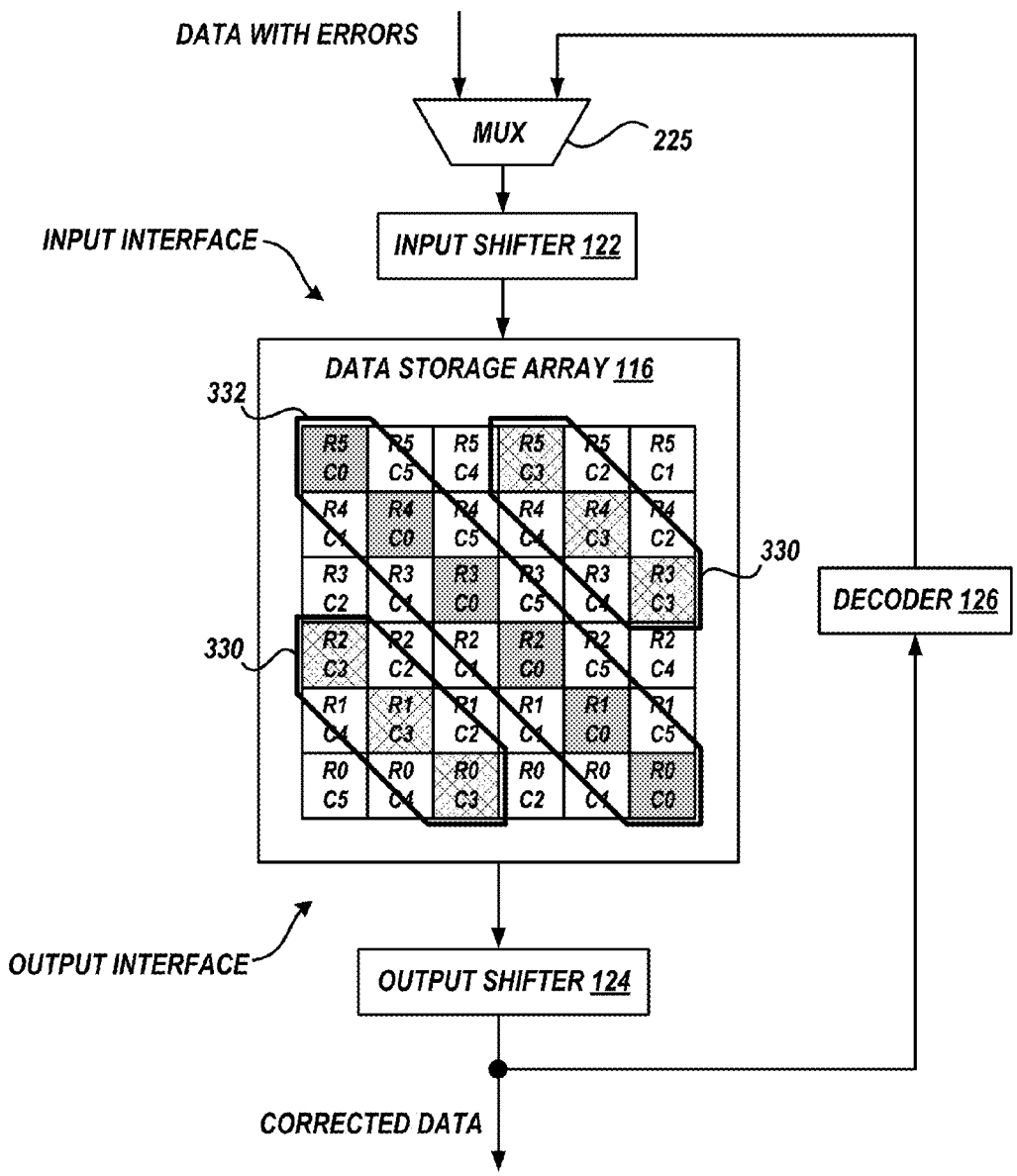

In certain embodiments, as shown in FIG. 5, the data entering storage array 116 is shifted such that an entire row may still be fed to the requesting device in a single hardware clock cycle. Still in certain embodiments, the data entering storage array 116 is shifted such that an entire column or an entire row may be fed to the requesting device in a single hardware clock cycle.

Data exiting storage array 116 is shifted by output shifter 124 such that the lowest order bit(s) within the output word is located in the lowest order position. In certain implementations, the output shifter 124 un-shifts a particular data word to be organized as it was prior to being shifted by input shifter 122. In other words, output shifter 124 reverses the shift performed by input shifter 122.

In certain embodiments, data word 310 may be read by addressing column C0 and physically diagonally accessing storage elements 302, 312, 314, and 316 of storage array 116 and may be un-shifted by output shifter 124 (if needed) to obtain the C0 column addressed word in a single clock cycle. Likewise, data word 300 may be read by addressing R0 and physically horizontally accessing storage element 302, 304, 306, and 308 of storage array 116 and may be un-shifted by output shifter 124 (if needed) to obtain the R0 row addressed data word in a single clock cycle.

FIG. 5 depict exemplary multidimensional storage array 116 including an input shifter 122 and output shifter 124, according to various embodiments of the present invention. In certain embodiments storage array 116 may support simultaneous loading of data into and out of the array 116. For example, data word 332 addressed by column C0 that may have been previously read from storage array 116 is being loaded back to storage array 116 via an input interface at the same time data word 330 addressed by column C3 is being unloaded from storage array 116 via the output interface.

To achieve simultaneous loading and unloading, storage array 116 may be a dual ported memory structure with independent write and read capability. In other words, data may be unloaded from one storage element via the output interface while different data is loaded to a different storage element in the same physical column via the input interface. Simultaneous loading and unloading of storage array 116 may be useful when the requesting device is decoder 126, as simultaneous loading and unloading may improve latency imposed by the decoder 126. The number of hardware clock cycles required to correct data in decoder 126 may be relatively high. Therefore, to improve latency of the overall system, row addressed data words and/or column addressed data words may be unloaded from storage array 116 simultaneously with the loading of data words returning from decoder 126.

Figure 6:
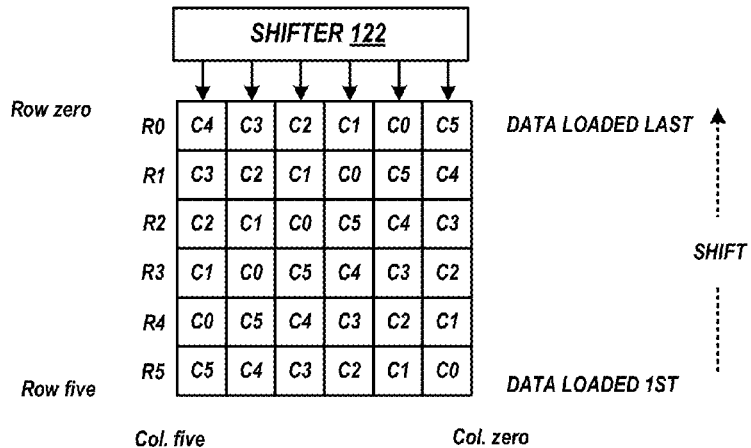
FIG. 6 depicts exemplary shifting of data words by input shifter that are stored within a multidimensional storage array, according to various embodiments of the present invention.

FIG. 6 depicts exemplary shifting of data words by input shifter 122 prior to loading the shifted data words within multidimensional storage array 116, according to various embodiments of the present invention. For example, data words may be loaded into storage array 116, via shifter 122, by for example, processor 101, decoder 126, etc. Data words may be loaded into storage array 116 serially or sequentially. For example, as shown in FIG. 6, a first data word may be loaded into storage elements associated with row five of the array. The first data word may be orientated to have a lowest order bit(s) in storage element with address of column zero and row five of the array.

A second data word may be shifted by input shifter 122 and loaded into storage elements of row four of the array. The second data word may be orientated to have a lowest order bit(s) in storage element with address of column five and row four of the array. A third data word may be shifted by input shifter 122 and loaded into storage elements of row three of the array. The third data word may be orientated to have a lowest order bit(s) in storage element with address column four and row three. A fourth data word may be shifted by input shifter 122 and loaded into storage elements of row two. The second data word may be orientated to have a lowest order bit(s) in storage element of column three and row two.

Subsequent data words may be further shifted by input shifter 122 and loaded into storage array 116 until a last data word is shifted by input shifter 122 and loaded into storage elements of row zero. The last data word may be orientated to have a lowest order bit(s) in storage element with address of column one and row zero. As shown in FIG. 6 input shifter 122 may implement a variable length shift, circular shift, bitwise rotation, etc. wherein the orientation of serial data words is shifted by one position relative to a first data word or previous data word, respectively. For example, the first loaded data word may not be shifted by input shifter 122 and loaded into appropriate storage elements and the next data word may be shifted by one position and loaded into corresponding storage elements, etc. In other embodiments, input shifter 122 may implement a variable length shift, bitwise rotation, etc. wherein the orientation of serial data words is shifted by more than one position relative to a first data word or previous data word, respectively.

In certain embodiments, input shifter 122 may be a digital circuit that can shift a data word by a specified number of bits in one clock cycle. It can be implemented as a sequence of multiplexers and in such an implementation the output of one multiplexer is connected to the input of the next multiplexer in a way that depends on the shift distance. For example, a four-bit input shifter 122 may shift a data word containing A, B, C and D. Input shifter 122 may cycle the order of the bits ABCD, DABC, CDAB, or BCDA. In other words, the input shifter 122 may make any combination of A, B, C and D. In certain embodiments, input shifter 122 includes a shift counter that is serially incremented upon data words being loaded into storage array 116. The input shifter 122 may utilize the shift counter to indicate a length to shift a particular data word.

In certain embodiments, input shifter 122 implements a particular shift scheme to expose data of the data word such that an entire single column addressed data word or an entire single row addressed data word may be fed to the requesting device in a single hardware clock cycle.

Figure 7:
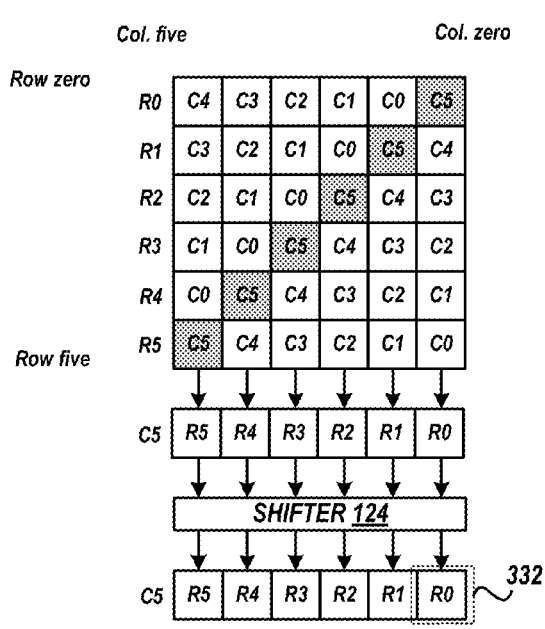
FIG. 7-FIG. 9 depict exemplary shifting of data words stored within multidimensional storage arrays by an output shifter, according to various embodiments of the present invention.

FIG. 7 depicts exemplary shifting of data words stored within multidimensional storage array 116 by an output shifter 124, according to various embodiments of the present invention. For example, data may be unloaded from storage array 116 and fed to for example, processor 101, decoder 126, etc. In certain embodiments the data unloaded from storage array 116 is shifted by output shifter 124. A data word may be unloaded from storage array 116 having either a row or column address. For example, as shown in FIG. 7, a column addressed data word (C5) may be unloaded from the storage element located at physical row five and physical column five, the storage element located at physical row four and physical column four, the storage element located at physical row three and physical column three, the storage element located at physical row two and physical column two and the storage element located at physical row one and physical column one, respectively. The data word exiting storage array 116 may be shifted by output shifter 124 such that the lowest order bit(s) within the data word are located in the lowest order position 332. As shown in FIG. 7 the data word may be arranged such that the lowest order bit(s) within the data word is located in the lowest order position 332. As such, shifter 124 need not shift the particular data word.

Figure 8:
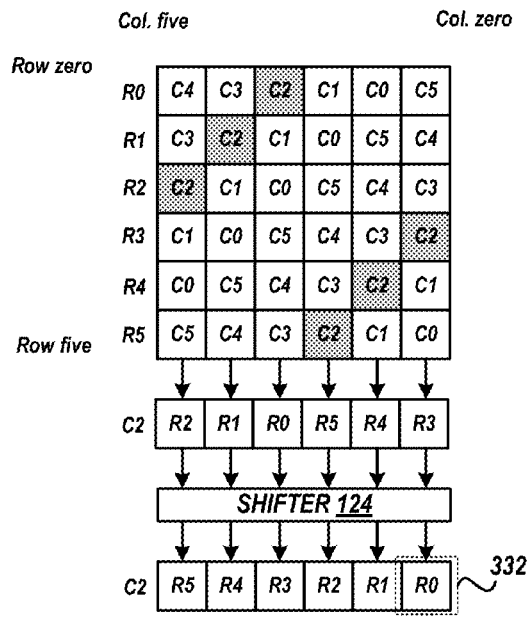

FIG. 8 depicts exemplary shifting of data words stored within multidimensional storage array 116 by an output shifter 124, according to various embodiments of the present invention. For example, as shown in FIG. 8, a column addressed data (C2) word may be unloaded from the storage element located at physical row two and physical column five, the storage element located at physical row one and physical column four, the storage element located at physical row zero and physical column three, the storage element located at physical row five and physical column two, the storage element located at physical row four and physical column one and the storage element located at physical row three and physical column zero, respectively. The data word exiting storage array 116 may shifted by output shifter 124 such that the lowest order bit(s) within the data word are located in the lowest order position 332. For example, the bit(s) of the data word addressed at C2R0 prior to being shifted by output shifter 124 are at the lowest order position 332.

Figure 9:
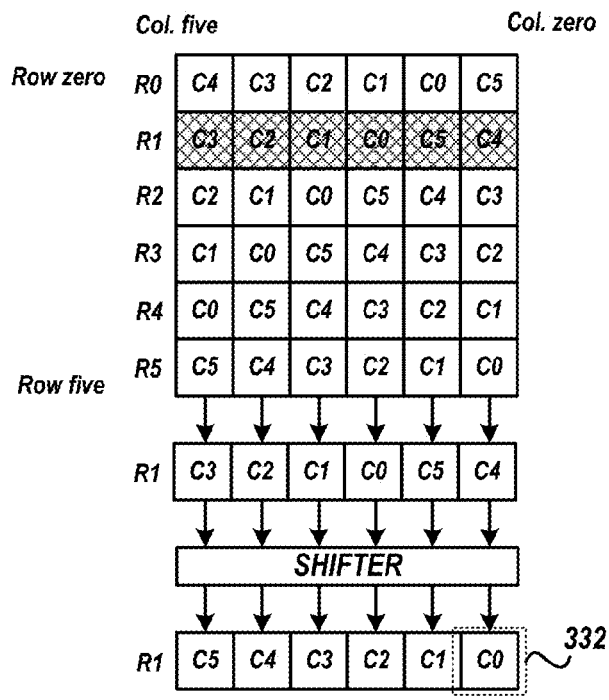

FIG. 9 depicts exemplary shifting of data words stored within multidimensional storage array 116 by an output shifter 124, according to various embodiments of the present invention. For example, as shown in FIG. 9, a row orientated data word (R1) may be unloaded from the storage elements located in physical row one. The data word exiting storage array 116 may shifted by output shifter 124 such that the lowest order bit(s) within the data word are located in the lowest order position 332. For example, the bit(s) of the data word at storage element R1C0 prior to being shifted by output shifter 124 are at the lowest order position 332.

Figure 10:
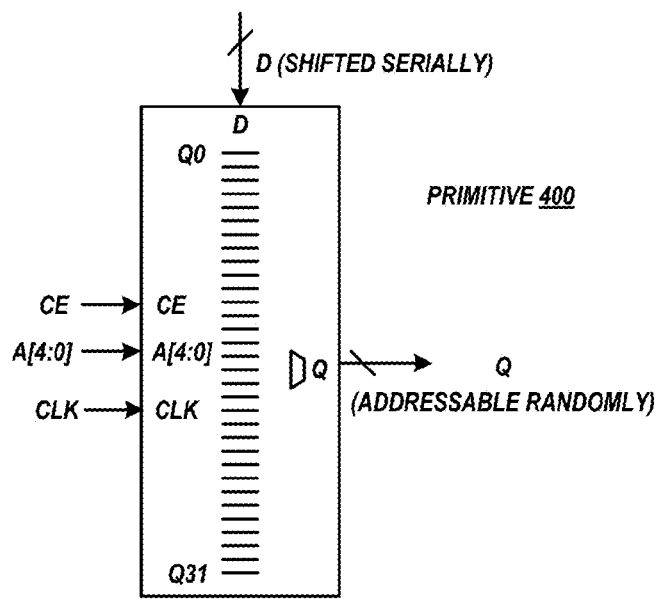
FIG. 10 depicts an exemplary storage primitive, according to various embodiments of the present invention.

FIG. 10 depicts an exemplary storage primitive, according to various embodiments of the present invention. Although the preceding description may utilize dual-ported memories to enable access of a storage array, there are other means of achieving similar results. For example, a storage primitive 400 may function as a serial shift register for data entering the primitive. In certain implementations, primitive 400 may be a SRLC32E XILINX® primitive, available in field programmable gate array devices sold by Xilinx Inc.

Data may be written into primitive 400 by sequentially shifting the data into the memory instead of loading the data at a random address. Data may be read from primitive 400 via random access of a particular shift tap. Primitive 400 may corresponds to a particular cluster of storage elements. For example, primitive 400 may be a particular cluster of vertically arranged storage elements in the array. Therefore, row addressed data words are shifted sequentially into a collection of primitives 400, where each primitive 400 corresponds to a different physical column of the array.

Figure 11:
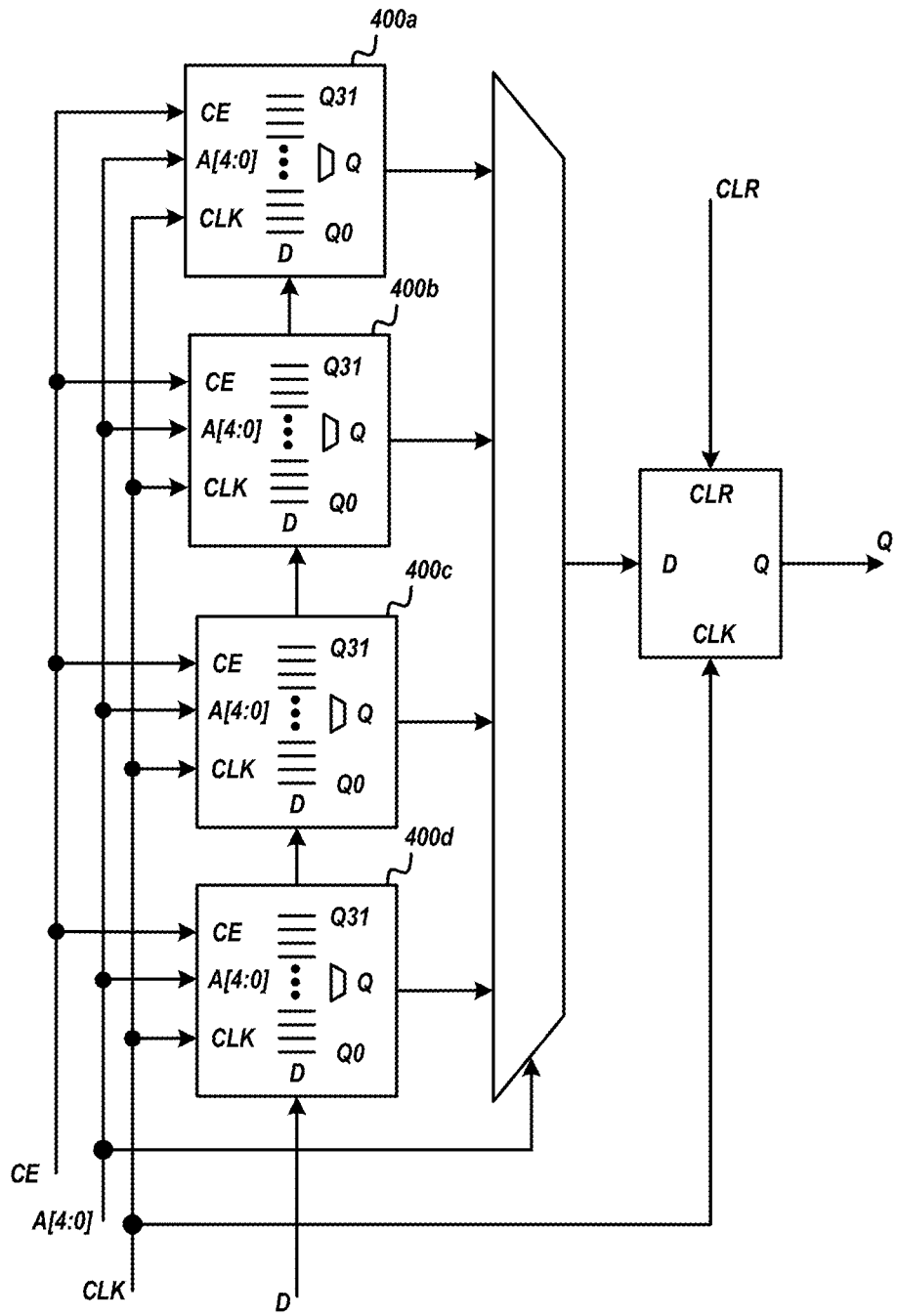
FIG. 11 depicts an exemplary concatenation of multiple storage primitives, according to various embodiments of the present invention.

FIG. 11 depicts an exemplary concatenated storage primitive 400 scheme having multiple primitives 400.

Primitive 400 may be a variable length, 0 to 31 clock cycle shift register. Primitive 400 can be of a fixed length, static length, or dynamically adjusted by changing the address lines. Primitive 400 may include a shift depth selection (A[4:0]) to support multiple primitives 400a-400d to be cascaded in order to create deeper memories. Q may be primitive 400 data output. A Q31 output of a primitive may connect to a D input of a subsequent primitive 400. D may be the primitive 400 data input. CLK may be a clock input. CE may be an active high clock enable. A[4:0] may be a dynamic depth selection of primitive 400. For instance, A=11111 may indicate a 32 bit shift. A=00000 may indicate a 1 bit shift.

Figure 12:
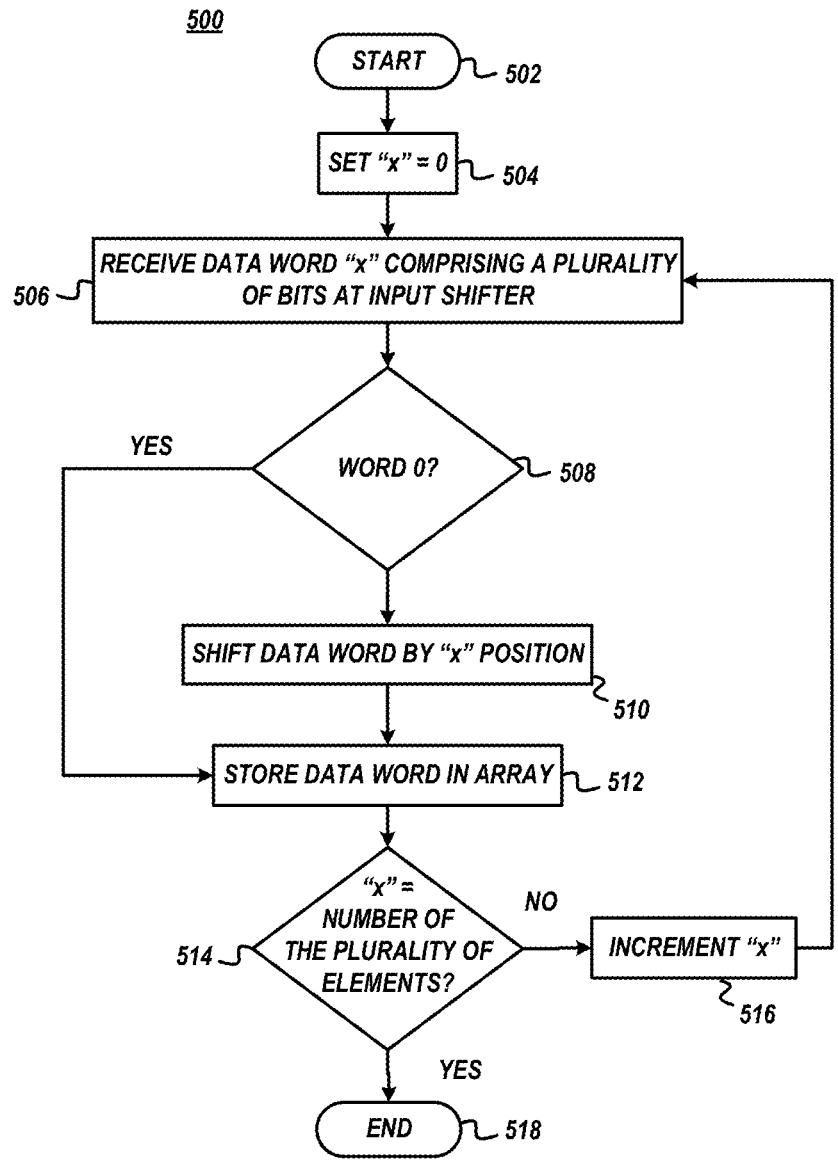
FIG. 12 depicts an exemplary block diagram of a method of loading data to a multidimensional storage array, according to various embodiments of the present invention.

FIG. 12 depicts an exemplary block diagram of a method 500 of loading data to a multidimensional storage array, according to various embodiments of the present invention. In various embodiments, method 500 may be implemented using a logic 119 module, shown in FIG. 1, etc. Method 500 begins at block 502 and continues with a variable "x" being set to 0 (block 504). For example, storage array 116 sets the variable "x" to 0. The variable "x" may be utilized as a counter in the iterative process of loading data into storage array 116.

Method 500 continues with input shifter 122 receiving data word x that includes a plurality of bits (block 506). For example, a row orientated data word or a column orientated data word may be received by an input shifter 122 included within data array 116. In another example, a data word may be received by an input shifter 122 included within another computer 100 component, such as processor 101.

Method 500 continues with input shifter 122 determining if the received data word is a first data word or word 0 (block 508). If this is the case, input shifter 122 loads or stores the first data word into storage array 116 (block 512). For example, a first row orientated data word may be loaded into row zero of storage array 116 and/or a first column orientated data word may be loaded into column zero of storage array 116.

If a first data word has previously been loaded into storage array 116, so that the received data word is not word 0 (no at block 508), the input shifter 122 shifts the data word by "x" position (block 510). For example, input shifter 122 serially shifts incoming data words to expose column addressed data words and expose row addressed data words such that an entire column addressed data word or an entire row addressed data word may be fed to a requesting device in a single hardware clock cycle. For instance if the variable "x" is equal to 50, input shifter 122 may shift the bit positioning of the 51st data word by 50 places. Input shifter 122 may then load or store the shifted data word to storage array 116 (block 512).

In certain embodiments, input shifter 122 may determine if the variable "x" is equal to the number of storage elements within each row and column of storage array 116 (block 514). If the variable "x" does not equal the number of storage elements within each row and column of storage array 116, the variable "x" is incremented (block 516). Method 500 ends at block 518.

Figure 13:
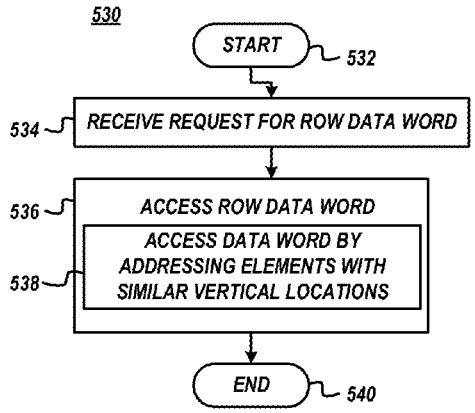
FIG. 13 depicts an exemplary block diagram of a method of accessing a row within a multidimensional storage array, according to various embodiments of the present invention.

FIG. 13 depicts an exemplary block diagram of a method 530 of accessing a row within a multidimensional storage array, according to various embodiments of the present invention. In various embodiments method 530 may be implemented using logic 119 module, as shown in FIG. 1, etc. Method 530 begins at block 532 and continues with storage array 116 receiving a request sent from a requesting device such as processor 101 or decoder 126 for a row addressed data word stored within storage array 116 (block 534). Method 530 continues with storage array 116 (e.g. array manager 118, etc.) accessing the row address data word (block 536). In certain embodiments the requesting device accesses the row addressed data word directly. In certain embodiments the row addressed data word may be accessed by addressing storage elements within storage array 116 that have similar vertical locations or addresses (block 538). In certain embodiments, the row addressed data word is accessed by the requesting device in one hardware clock cycle. Method 530 ends at block 540.

Figure 14:
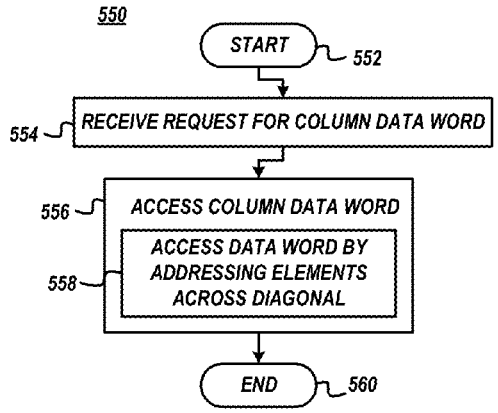
FIG. 14 depicts an exemplary block diagram of a method of accessing a column within a multidimensional storage array, according to various embodiments of the present invention.

FIG. 14 depicts an exemplary block diagram of a method 550 of accessing a column within a multidimensional storage array, according to various embodiments of the present invention. In various embodiments method 550 may be implemented using logic 119 module, as shown in FIG. 1, etc. Method 550 begins at block 552 and continues with storage array 116 receiving a request sent from a requesting device such as processor 101 or decoder 126 for a column addressed data word stored within storage array 116 (block 554). Method 550 continues with storage array 116 (e.g. array manager 118, etc.) accessing the column addressed data word (block 556). In certain embodiments the requesting device accesses the column addressed data word directly. In certain embodiments, the column addressed data word may be accessed by addressing storage elements within storage array 116 across diagonals or diagonal addresses (block 558). In certain embodiments, the column addressed data word is accessed by the requesting device in one hardware clock cycle. Method 550 ends at block 560.

Figure 15:
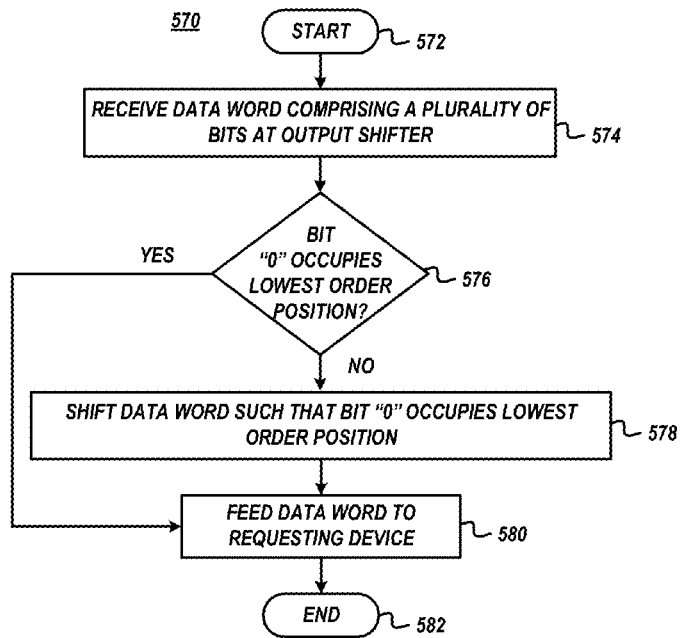
FIG. 15 depicts an exemplary block diagram of a method of unloading data from a multidimensional storage array, according to various embodiments of the present invention.

FIG. 15 depicts an exemplary block diagram of a method 570 of unloading data from a multidimensional storage array 116, according to various embodiments of the present invention. In various embodiments method 570 may be implemented using logic 119 module, as shown in FIG. 1, etc. Method 570 begins at block 572 and continues with output shifter 124 receiving a data word comprising a plurality of bits (block 574). For example, a data word may be received by an output shifter 124 included within data array 116. In another example, a data word may be received by an output shifter 124 included within another computer 100 component, such as processor 101.

Method 570 continues with output shifter 124 determining whether the received data word is orientated such that the lowest bit occupies the lowest order position (block 576). For example, the received data word may be orientated such that the lowest bit occupies the lowest order position if the received data word was the first row addressed data word or the first column addressed data word.

If the lowest bit does not occupy the lowest order position (i.e. the data word has been shifted by input shifter 122, etc.), the output shifter 124 shifts the received data word such that the lowest bit occupies the lowest order position (block 578). In certain embodiments, the output shifter 124 may determine the variable or count "x" associated with the length of input shift, and un-shift the received data word by a similar length "x." In certain embodiments, output shifter 124 undoes the shift implemented by the input shifter 122. Method 570 continues with storage array 116 feeding the data word to the requesting device (block 580). In certain embodiments storage array 116 may push the data word to the requesting device and in other embodiments the requesting device may pull the data word from storage array 116. In certain embodiments, the data word is accessed by the requesting device in one hardware clock cycle. Method 570 ends at block 582.

Figure 16:
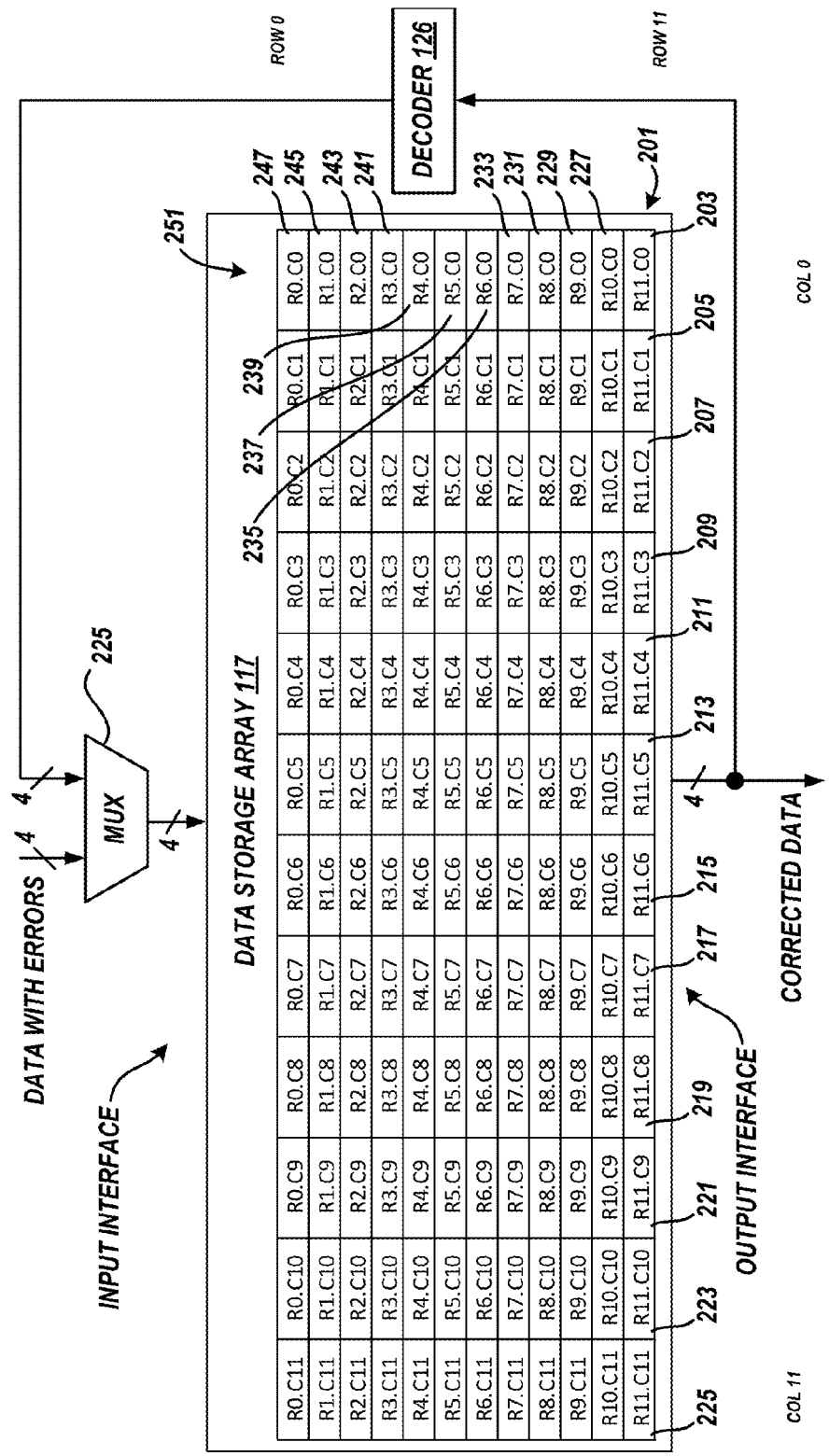
FIG. 16 depicts an exemplary multidimensional storage array including horizontal and vertical data words.

FIG. 16 depicts an exemplary multidimensional storage array 117 including row addressed and/or column addressed data words. Storage array 117 is a multidimensional array made of storage elements arranged into physical rows and physical columns. The storage array 117 may include a plurality of storage elements 203, 205, 207, 209, 211, 213, 215, 217, 219, 221, 223, and 225 that each store data that together may store a row addressed data word 201 addressed by R11. In a particular iteration, the R11 addressed data word 201 may be physically arranged horizontally in storage array 117. Likewise, the storage array 117 may include a plurality of storage elements 201, 227, 229, 231, 233, 237, 239, 241, 243, 245, and 247 that each store data that together store a column addressed data word 251 addressed by C0. In the particular iteration, the C0 addressed data word 251 is physically arranged vertically in storage array 117.

Though the physical storage elements of array 117 have a fixed or static physical arrangement, the data word array existing within the array 117 appears to be dynamic since data words may move into and exit array 117 during any given clock cycle. For example, a storage element may initially store data of a particular data word. In a first instance, in association with decoder 126 requesting an entire row addressed data word, the data may be obtained by decoder 126 from the storage element, corrected (if needed), and returned to the same storage element. At a subsequent instance, in association with the requesting device requesting an entire column addressed data word, the data may be obtained by decoder 126 from the storage element, corrected (if needed), and returned to the same storage element. In other words, data within a particular storage element may first exit the array 117 as being associated with a row addressed data word and subsequently exit the array 117 as being associated with a column addressed data word.

In certain embodiments, as shown in FIG. 16, data word 201 may be orthogonally arranged to data word 251. Each physical storage element may have a unique address made up of a physical row identifier or component and a physical column identifier or component. Though shown having 12 physical rows and 12 physical columns, storage array 117 may include greater or fewer physical rows and columns as appropriate. Generally, embodiments of the present invention are advantageously utilized when the number of physical rows and columns are large, making the reading or writing of a row addressed data word or a column addressed data word to traditional memories (e.g. DRAM, etc.) inefficient.

Storage array 117 generally stores multiple data words that are each either addressed by a row address (i.e. a data word obtained from associated physical storage elements of the array 117 by supplying a single row address or similar row address component) or by a column address (i.e. a data word obtained from associated physical storage elements of the array 117 by supplying a single column address or similar column address component).

In various embodiments of the present invention, a single data bit may be stored within an individual physical storage element. However, in other embodiments, multiple data bits or bytes may be stored within an individual physical storage element. For example, a particular storage element may be able to store 8 bytes of data.

In certain embodiments, multiple data words may be simultaneously loaded and unloaded from storage array 117. For example, four row addressed data words or four column addressed data words in their entirety, respectively, may be loaded into storage array 117 or from storage array 117 simultaneously in a single clock cycle. In certain embodiments, storage array 117 is populated from a Flash memory device. For example, storage array 117 may be loaded with data retrieved from a NAND flash storage device, a Solid State Drive (SSD) device, etc. In certain embodiments, data unloaded from storage array 116 may be delivered to a requesting device, such as a decoder 126.

In a particular embodiment, array 117 is utilized in a particular error correction system. Data words are populated into array 117 by e.g. a Flash memory device. Once populated, multiple row addressed data words in storage array 117 are fed from the output interface in a single clock cycle. The multiple row addressed data words are fed to decoder 126 and may be therein corrected (if needed). The multiple row addressed data words are returned to the array 117 via the input interface in a single clock cycle. After all the row addressed data words have been processed by decoder 126, multiple column addressed data words are fed from the output interface in a single clock cycle. The multiple column addressed data words are passed to decoder 126 and may be corrected (if needed). The multiple column addressed data words are returned to the array 117 via the input interface in a single clock cycle.

In certain embodiments, a multiplexer 225 or a series of multiplexers 225 may be utilized to select several data words and forward the selected data words to the array 117. For example, multiplexer 225 may select either four data words from an a upstream device (such data words may contain errors) or four decoded data words from decoder 126 and forward the selected four data words to array 117, as shown in FIG. 16, or forward each particular data word of the four selected data words to a respective input shifter 122E, 122F, 122G, or 122H, as shown in FIG. 17, etc.

In various embodiments, storage array 117 may be comprised within a NAND flash storage device 125, comprised within a storage controller device that resides within NAND flash storage device 125, etc. In some embodiments, storage array 117 may be comprised within a FPGA, ASIC, etc.

Figure 17:
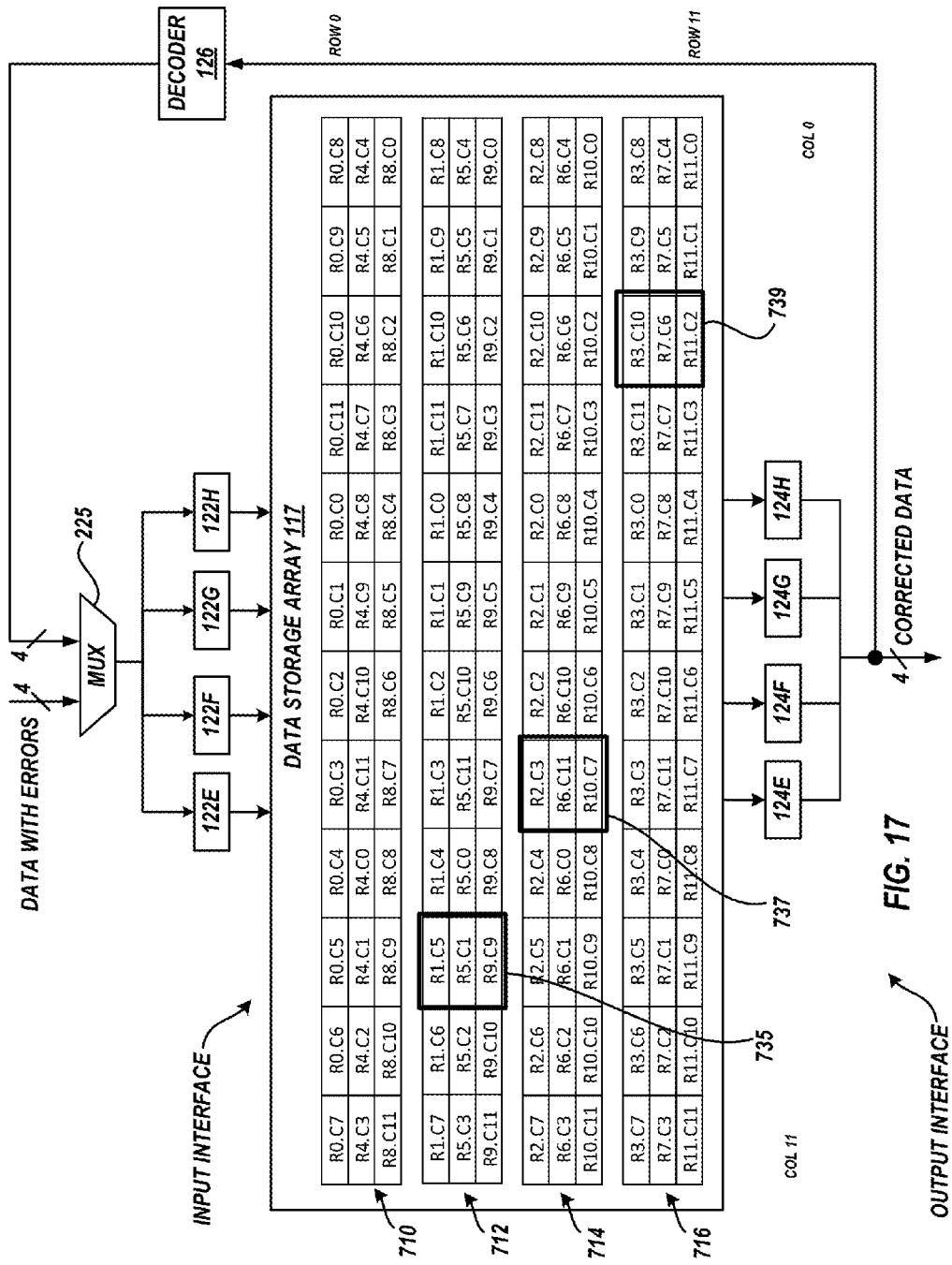
FIG. 17 depicts an exemplary multidimensional storage array including array partitions, according to embodiments of the present invention.

FIG. 17 depicts an exemplary multidimensional storage array 117 including array partitions 710, 712, 714, and 716, multiple input shifters 122E-122H, and multiple output shifters 124E-124H, according to embodiments of the present invention. By partitioning the storage array 117 and associating an input shifter 122 and output shifter 124 with each partition, multiple row addressed data words or multiple column addressed data words, respectively, may be loaded and/or unloaded from array 117 simultaneously in a single clock cycle.

Data words entering a partition of array 117 are shifted by a particular input shifter 122 and data exiting the partition of storage array 117 is shifted by a particular output shifter 124. In other words, a particular input shifter 122 and output shifter 124 are associated with a particular partition. For example, input shifter 122E and output shifter 124E loads and unloads, respectively, data words to or from partition 710, input shifter 122F and output shifter 124F loads and unloads, respectively, data words to or from partition 712, input shifter 122G and output shifter 124G loads and unloads, respectively, data words to or from partition 714, and input shifter 122H and output shifter 124H loads and unloads, respectively, data words to or from partition 716. For clarity, each input shifter 122E-122H may be a particular input shifter 122. Therefore, each input shifter 122E-122H may implement a circular shift, bitwise rotation, variable length serial shift, etc.

Each partition of storage array 117 is generally a predefined set of physically arranged rows or columns of storage elements of the storage array 117. As such, each partition is a storage area including the predefined storage elements. For example, as depicted in FIG. 17, partition 710 includes storage elements of physical row 0, physical row 4, and physical row 8, partition 712 includes storage elements of physical row 1, physical row 5, and physical row 9, partition 714 includes storage elements of physical row 2, physical row 6, and physical row 10, and partition 716 includes storage elements of physical row 3, physical row 7, and physical row 11. In a different example, storage array 117 could be arranged such that a first partition includes storage elements of physical column 0, physical column 4, and physical column 8, a second partition includes storage elements of physical column 1, physical column 4, and physical column 9, a third partition includes storage elements of physical column 2, physical column 6, and physical column 10, and a fourth partition includes storage elements of physical column 3, physical column 7, and physical column 11.

The storage elements of storage array 117 are grouped within independently addressable clusters. In an embodiment, each cluster of physical storage elements are physically vertically aligned storage elements within the array 117. In other words, each physical column of storage elements may be an independently addressable cluster. In another embodiment, each physical column of storage elements within each array partition is an independently addressable cluster. Unless otherwise indicated herein, an independently addressable cluster means that data from only one physical storage element within the cluster is provided from the cluster in any particular clock cycle. Generally, when array 117 is configured to store entire row addressed data words within each partition, the independently addressable clusters are generally physically vertically arranged—i.e. each column within the partition is an independently addressable cluster. When array 117 is configured to store entire column addressed data words within each partition, the independently addressable clusters are generally physically horizontally arranged—i.e. each row within the partition is an independently addressable cluster.

For example, an independently addressable cluster 735 includes three storage elements in the same physical column within partition 712. One of three addresses are provided so that data stored in one of the three storage elements is provided from the cluster in any given clock cycle. For example, data addressed by one of R1C5, R5C1, or R9C9 addresses may be provided from cluster 735 at a particular clock cycle. Similarly, an independently addressable cluster 737 includes three storage elements in the same physical column within partition 714. Data addressed by one of R2C3, R6C11, or R10C7 addresses may be provided from cluster 737 at a particular clock cycle. Likewise, an independently addressable cluster 739 includes three storage elements in the same physical column within partition 716. Data addressed by one of R3C10, R7C6, or R11C2 addresses may be provided from cluster 739 at a particular clock cycle.

The storage array 117 may include a plurality of storage elements that together store a particular data word. The data may be a row addressed data word or may be a column addressed data word. In those embodiments, where entire physical rows of storage elements are included in each partition, entire row addressed data words are stored in the partitions. For example, as depicted in FIG. 17, partition 710 stores row addressed data word R0 in physical storage element row 0, stores row addressed data word R4 in physical storage element row 4, etc. When multiple rows are to be simultaneously unloaded from array 117 in a single clock cycle, a single row from each partition is unloaded to a particular output shifter 124. Further in the embodiments where entire physical rows of storage elements are included in each partition, segments or portions of entire column addressed data words are stored in the partitions. When multiple columns are to be simultaneously unloaded from array 117 in a single clock cycle, segments of multiple columns from each partition are unloaded to a particular output shifter and combined with the other segments unloaded from the other partitions to the other output shifters.

The various data word sections may be combined by the requesting device. In these instances, the requesting device receives the sections of requested data words simultaneously in the logical order to form the requested data words. The various data word sections may also be combined prior to being provided to the requesting device be an intermediary device between the output shifters and the requesting device.

Likewise, in those embodiments where partitions of array 117 include predefined columns, entire multiple columns may be unloaded from each partition simultaneously in a single clock cycle and segments of multiple rows may be unloaded from each partition and combined. For clarity, the embodiments where partitions include entire physical rows are herein described and depicted.

The data entering storage array 117 is shifted by the input shifter 122 associated with each partition to expose each storage element of any particular row addressed data word or any associated segments of column addressed data words in the partition to the output interface. In the context of unloading multiple row addressed data words or column addressed data words in a single clock cycle utilizing array partitions and multiple input shifters 122 and multiple output shifters 124, in those embodiments where each partition includes predefined physical rows of storage elements, the term expose, or the like, means that the storage elements within a particular storage array 117 partition that store segments of multiple shifted column addressed data words and entire multiple row addressed data words are physically located in unique columns. Likewise, in those embodiments where each partition includes predefined physical columns of storage elements, the term expose, or the like, means that the independently addressable storage elements within a particular storage array 117 partition that store segments of multiple shifted row addressed data words and entire multiple column addressed data words are physically located in unique rows.

Further, the data words entering each partition of array 117 are shifted by the associated input shifter 122 on a per partition basis. For example, the first row addressed data word R11 stored in partition 716 may not be shifted by input shifter 122H, the first row addressed data word R10 stored in partition 714 may not be shifted by input shifter 122G, the first row addressed data word R9 stored in partition 712 may not be shifted by input shifter 122F, and the first row addressed data word R8 stored in partition 712 may not be shifted by input shifter 122E. The data words may subsequently be loaded simultaneously from the respective input shifter 122 into the associated array 117 partition in a single clock cycle.

The size of the shift of a subsequent to be loaded data words depends upon the physical distance between the first physical row/column of storage elements and the physical row/column of storage elements to which the data word is to be loaded. For example, the second row addressed data word R7 stored in partition 716 is circularly shifted by four places by input shifter 122H due to the locational spacing of physical row eleven and physical row seven. Likewise, the second row addressed data word R6 stored in partition 714 is circularly shifted by four places by input shifter 122G, the second row addressed data word R5 stored in partition 712 is circularly shifted by four places by input shifter 122F, and the second row addressed data word R4 stored in partition 710 is circularly shifted by four places by input shifter 122E. The circularly shifted data words may subsequently be simultaneously loaded from the respective input shifter 122 into the associated array 117 partition in a single clock cycle.

Likewise, the size of the shift of a subsequent to be loaded data words depends upon the physical distance between the first physical row/column of storage elements and the physical row/column of storage elements to which the data word is to be loaded. For example, the third row addressed data word R3 stored in partition 716 is circularly shifted by eight places by input shifter 122H due to the locational spacing of physical row eleven and physical row three. Likewise, the third row addressed data word R2 stored in partition 714 is circularly shifted by eight places by input shifter 122G, the third row addressed data word R1 stored in partition 712 is circularly shifted by eight places by input shifter 122F, and the third row addressed data word R0 stored in partition 710 is circularly shifted by eight places by input shifter 122E. The circularly shifted data words may subsequently be simultaneously loaded from the respective input shifter 122 into the associated array 117 partition in a single clock cycle.

As exemplary shown in FIG. 17, upon the circular shift of each data word loaded to respective partitions of array 117, each row addressed data word is exposed to the output interface. For example, the data of row addressed data word R0 is stored in storage elements in partition 710 physically located in unique storage element columns. Likewise, multiple segments of column addressed data words are also stored in each partition. For example, three segments of column addressed data words C11, C10, C9, and C8 are stored in storage elements of partition 710 physically located in unique storage element columns. In other words, a first segment (R8.C11, R8.C10, R8.C9, and R8.C8) of column addressed data words C11, C10, C9, and C8 are stored in physical storage element row eight in unique physical storage element columns of partition 710, a second segment (R4.C11, R4.C10, R4.C9, and R4.C8) of column addressed data words C11, C10, C9, and C8 are stored in physical storage element row four in unique physical storage element columns of partition 710, and a third segment (R0.C11, R0.C10, R0.C9, and R0.C8) of column addressed data words C11, C10, C9, and C8 are stored in physical storage element row zero in unique physical storage element columns of partition 710. Because each storage element within respective partitions that store column addressed data words C11, C10, C9, and C8 are physically located in a unique storage element column (per each partition), column addressed data word C11, C10, C9, and C8 segments are exposed to respective output shifters 124E-124H such that each data word C11, C10, C9, and C8 segment may be unloaded by the associated output shifter 124 simultaneously in a single clock cycle, un shifted by the associated output shifter 124 and combined with the other C11, C10, C9, and C8 segment to reform the column addressed data words C8, C9, C10, and C11.

Data words or data word segments exiting storage array 117 are shifted by an associated output shifter 124 such that the lowest order bit(s) within the output word or output word segment is located in the lowest order position. In certain implementations, the output shifter 124 un-shifts a particular data word or data word segment to be organized as it was prior to being shifted by input shifter 122. In other words, output shifter 124 reverses the shift performed by input shifter 122 prior to the data word being loaded into the associated partition.

Data words are generally read from array 117 by addressing a particular column or a particular row. For example, a requesting device requests multiple row addressed data words or multiple column addressed data words from array 117. The multiple data words are retrieved by associated output shifters 124E-124H and therein shifted to reform the requested multiple data words. The reformed multiple data words are then provided by the output shifters 124E-124H to the requesting device.

In certain embodiments storage array 117 may support simultaneous loading of data into and out of the array 117. For example, multiple data words that may have been previously read from storage array 117 may be loaded back to storage array 117 via the input interface at the same time other multiple data words are being unloaded from storage array 117 via the output interface.

To achieve simultaneous loading and unloading, storage array 117 may be a dual ported memory structure with independent write and read capability. In other words, data may be unloaded from each storage element via the output interface while other data is loaded to a different storage element in the same storage element physical column via the input interface. Simultaneous loading and unloading of storage array 117 may be useful when the requesting device is decoder 126, as simultaneous loading and unloading may improve latency imposed by the decoder 126. The number of hardware clock cycles required to correct data in decoder 126 may be relatively high. Therefore, to improve latency of the overall system, multiple words may be unloaded from storage array 117 simultaneously with the loading of multiple data words into storage array 117.

For clarity, input shifters 122E-122H may implement a variable length shift, circular shift, bitwise rotation, etc. wherein the orientation of data words is shifted by an amount equal to the distance between the physical storage element row/column that is to receive the data word from a reference physical storage element row/column that stored a previously loaded data word in the same partition. The reference physical storage element row/column may be the first physical storage element row/column, a previous physical storage element row/column that stored a preceding data word in the same partition.

As input shifters 122E-122H are specific iterations of a general input shifter 122, each input shifter 122E-122H may be a digital circuit that can shift a data word by a specified number of bits in one clock cycle. They can be implemented as a sequence of multiplexers and in such an implementation the output of one multiplexer is connected to the input of the next multiplexer in a way that depends on the shift distance. Input shifters 122E-122H may include a shift counter that is serially incremented upon data words being loaded into storage array 116. The input shifter 122 may utilize the shift counter to indicate a length or amount to shift a particular data word. The output shifters 124E-124H may be similar devices or have similar functionality relative to input shifters 122E-122H but are configured to reverse the shift of data words by the input shifter.

FIG. 18A-FIG. 18C depict the loading of multiple data words from the associated input shifter 122 into the multidimensional storage array 117 at each incremental clock cycle, according to embodiments of the present invention. FIG. 18A depicts row address data words R11, R10, R9, and R8 being simultaneously loaded from a respective input shifter 122E-122H at a first loading clock cycle. For example, data word R11 is loaded from shifter 122H into partition 716 of array 117 at storage element physical row eleven, data word R10 is loaded from shifter 122G into partition 714 of array 117 at storage element physical row ten, data word R9 is loaded from shifter 122F into partition 712 of array 117 at storage element physical row nine, and data word R8 is loaded from shifter 122E into partition 710 of array 117 at storage element physical row eight all at the first loading clock cycle.

FIG. 18B depicts row address data words R7, R6, R5, and R4 being simultaneously loaded from a respective input shifter 122E-122H at a subsequent second loading clock cycle. For example, data word R7 is loaded from shifter 122H into partition 716 of array 117 at storage element physical row seven, data word R6 is loaded from shifter 122G into partition 714 of array 117 at storage element physical row six, data word R5 is loaded from shifter 122F into partition 712 of array 117 at storage element physical row five, and data word R4 is loaded from shifter 122E into partition 710 of array 117 at storage element physical row four all at the second loading clock cycle. Prior to loading the respective data words R7, R6, R5, and R4, the associated input shifter 122E-122H shifts the data word by an amount equal to the difference between the physical storage element row location of the preceding data word loaded and the storage element row location that the current data word is to be written to in the same partition. As shown in FIG. 18B, the difference between the physical storage element row location to which the current data word is to be loaded and the physical storage element row location of the preceding data word loaded in the same partition is four. For example, with reference to partition 716, four is the difference between physical storage element row seven (i.e. the physical storage element row to which the current data word R7 is to be loaded) and physical storage element row eleven (i.e. the physical storage element row location of the preceding data word R11 previously loaded in the same partition). Therefore, input shifter 122H shifts row addressed data word R7 by four positions prior to loading data word R7 into partition 716 at storage element physical row seven.

FIG. 18C depicts row address data words R3, R2, R1, and R0 being simultaneously loaded from a respective input shifter 122E-122H at a subsequent third loading clock cycle. For example, data word R3 is loaded from shifter 122H into partition 716 of array 117 at storage element physical row three, data word R2 is loaded from shifter 122G into partition 714 of array 117 at storage element physical row two, data word R1 is loaded from shifter 122F into partition 712 of array 117 at storage element physical row one, and data word R0 is loaded from shifter 122E into partition 710 of array 117 at storage element physical row zero all at the third loading clock cycle. Prior to loading the respective data words R3, R2, R1, and R0, the associated input shifter 122E-122H shifts the data word by an amount equal to the difference between the physical storage element row location of the first data word loaded and the storage element row location that the current data word is to be written to in the same partition. As shown in FIG. 18C, the difference between the physical storage element row location to which the current data word is to be loaded and the physical storage element row location of the first data word loaded in the same partition is eight. For example, with reference to partition 716, eight is the difference between physical storage element row three (i.e. the physical storage element row to which the current data word R3 is to be loaded) and physical storage element row eleven (i.e. the physical storage element row location of the first data word R11 previously loaded in the same partition). Therefore, input shifter 122H shifts row addressed data word R3 by eight positions prior to loading data word R3 into partition 716 at storage element physical row three. For clarity, instead of the partitions of array 117 arranged to accept row addressed data words as is shown in FIG. 18A-18C, the array 117 may be arranged to accept column addressed data words such that entire column addressed data words are stored in a single partition.

Figure 19A:
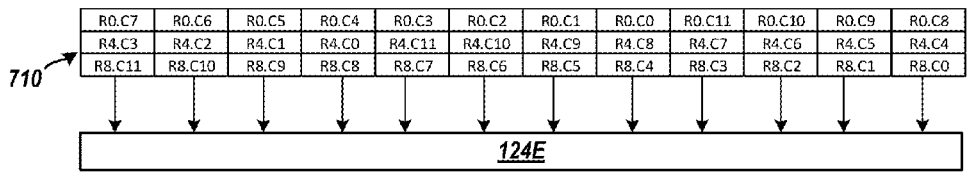
FIG. 19A-FIG. 19D depict reading of row addressed data words from the multidimensional storage array partitions at a first read clock cycle, according to embodiments of the present invention.

FIG. 19A-FIG. 19D depict simultaneously unloading or reading of row addressed data words from the multidimensional storage array 117 partitions at a first read clock cycle, according to embodiments of the present invention. FIG. 19A depicts the unloading of row addressed data word R8 from partition 710 to output shifter 124E at the first read clock cycle. Each storage element that stores the row addressed data word R8 is located in a unique physical column. Therefore, row addressed data word R8 is fully exposed to output shifter 124E and may be unloaded to output shifter 124E in a single clock cycle.

Figure 19B:
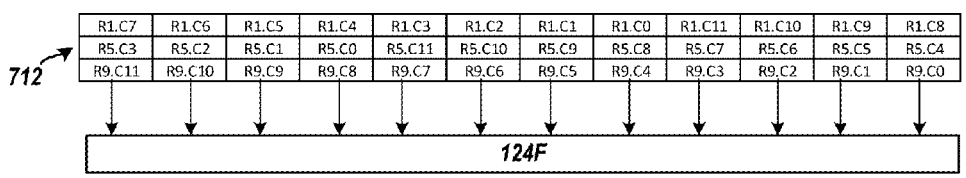

FIG. 19B depicts the unloading of row addressed data word R9 from partition 712 to output shifter 124F at the first read clock cycle. Each storage element that stores the row addressed data word R9 is located in a unique physical column. Therefore, row addressed data word R9 is fully exposed to output shifter 124F and may be unloaded to output shifter 124F in a single clock cycle.

Figure 19C:
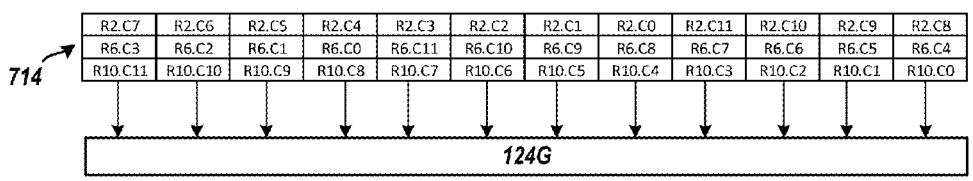

Likewise, FIG. 19C depicts the unloading of row addressed data word R10 from partition 714 to output shifter 124G at the first read clock cycle. Each storage element that stores the row addressed data word R10 is located in a unique physical column. Therefore, row addressed data word R10 is fully exposed to output shifter 124G and may be unloaded to output shifter 124G in a single clock cycle.

Figure 19D:
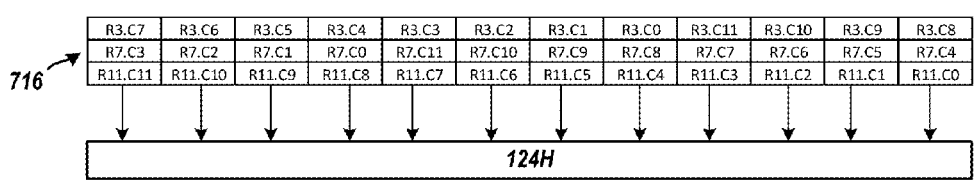

Likewise, FIG. 19D depicts the unloading of row addressed data word R11 from partition 716 to output shifter 124F at the first read clock cycle. Each storage element that stores the row addressed data word R11 is located in a unique physical column. Therefore, row addressed data word R11 is fully exposed to output shifter 124F and may be unloaded to output shifter 124F in a single clock cycle.

Therefore, the row addressed data words R8, R9, R10, and R11 may be provided to a requesting device simultaneously in a single clock cycle by output shifter 124E writing or otherwise providing data word R8, output shifter 124F writing or otherwise providing data word R9, output shifter 124G writing or otherwise providing data word R10, and output shifter 124F writing or otherwise providing data word R11 at the same clock cycle. In the present depicted example, the row addressed data words R8, R9, R10, and R11 were not shifted by respective input shifters 122E-122H. Therefore, respective output shifters 124E-124H need not un-shift the row addressed data words R8, R9, R10, and R11 prior to providing the row addressed data words R8, R9, R10, and R11 to the requesting device.

Figure 20A:
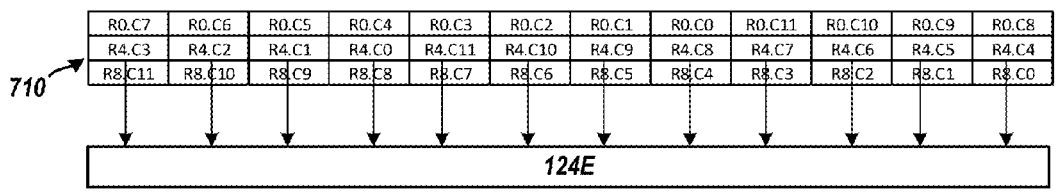
FIG. 20A-FIG. 20D depict reading of row addressed data words from the multidimensional storage array partitions at a second read clock cycle, according to embodiments of the present invention.

FIG. 20A-FIG. 20D depict simultaneously unloading or reading of row addressed data words from the multidimensional storage array 117 partitions at a subsequent second read clock cycle, according to embodiments of the present invention. FIG. 20A depicts the unloading of row addressed data word R4 from partition 710 to output shifter 124E at the second read clock cycle. Each storage element that stores the row addressed data word R4 is located in a unique physical column. Therefore, row addressed data word R4 is fully exposed to output shifter 124E and may be unloaded to output shifter 124E in a single clock cycle.

Figure 20B:
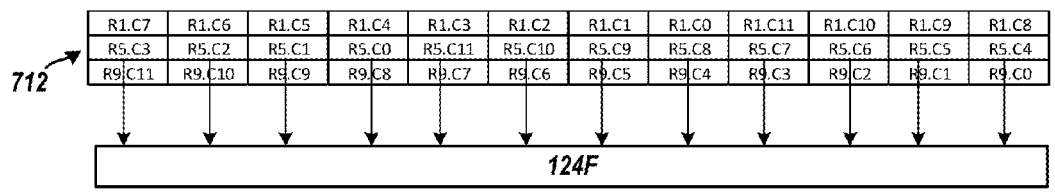

FIG. 20B depicts the unloading of row addressed data word R5 from partition 712 to output shifter 124F at the second read clock cycle. Each storage element that stores the row addressed data word R5 is located in a unique physical column. Therefore, row addressed data word R5 is fully exposed to output shifter 124F and may be unloaded to output shifter 124F in a single clock cycle.

Figure 20C:
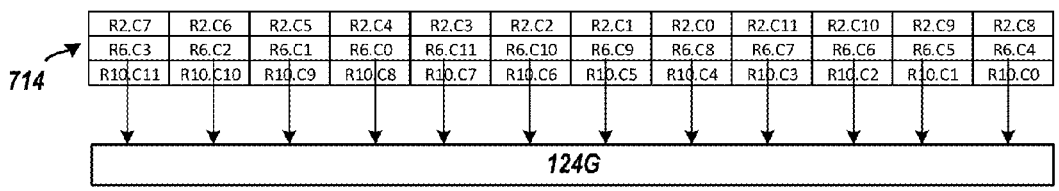

Likewise, FIG. 20C depicts the unloading of row addressed data word R6 from partition 714 to output shifter 124G at the second read clock cycle. Each storage element that stores the row addressed data word R6 is located in a unique physical column. Therefore, row addressed data word R6 is fully exposed to output shifter 124G and may be unloaded to output shifter 124G in a single clock cycle.

Figure 20D:
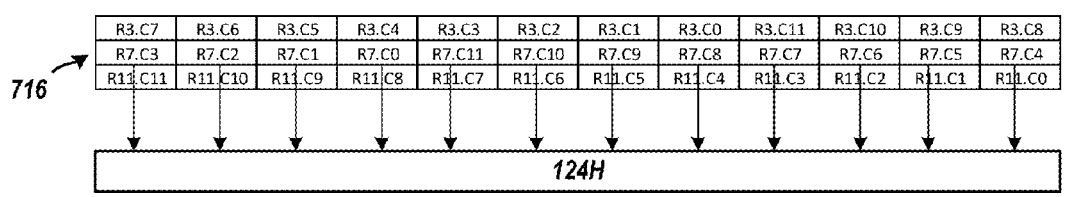

Likewise, FIG. 20D depicts the unloading of row addressed data word R7 from partition 716 to output shifter 124F at the second read clock cycle. Each storage element that stores the row addressed data word R7 is located in a unique physical column. Therefore, row addressed data word R7 is fully exposed to output shifter 124F and may be unloaded to output shifter 124F in a single clock cycle.

Therefore, the row addressed data words R4, R5, R6, and R7 may be provided to a requesting device simultaneously in a single clock cycle by output shifter 124E writing or otherwise providing data word R4, output shifter 124F writing or otherwise providing data word R5, output shifter 124G writing or otherwise providing data word R6, and output shifter 124F writing or otherwise providing data word R7 at the same clock cycle.

Prior to providing row addressed data word R4 to the requesting device, the output shifter 124E reverses the shift of the data word stored in storage element physical row four to reform the row addressed data word R4. Likewise, prior to providing row addressed data word R5 to the requesting device, the output shifter 124F reverses the shift of the data word stored in storage element physical row five to reform the row addressed data word R5 Likewise, prior to providing row addressed data word R6 to the requesting device, the output shifter 124G reverses the shift of the data word stored in storage element physical row six to reform the row addressed data word R6. Likewise, prior to providing row addressed data word R7 to the requesting device, the output shifter 124H reverses the shift of the data word stored in storage element physical row seven to reform the row addressed data word R7.

Figure 21A:
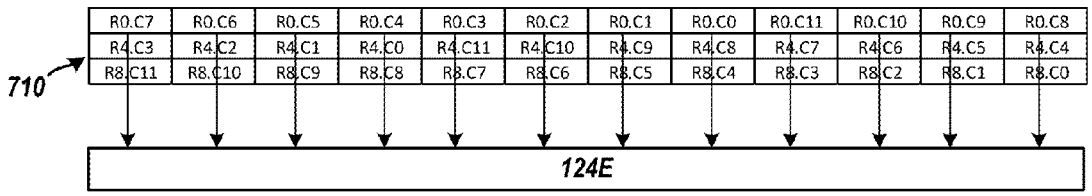
FIG. 21A-FIG. 21D depict reading of row addressed data words from the multidimensional storage array partitions at a third read clock cycle, according to embodiments of the present invention.

FIG. 21A-FIG. 21D depict simultaneously unloading or reading of row addressed data words from the multidimensional storage array 117 partitions at a subsequent third read clock cycle, according to embodiments of the present invention. FIG. 21A depicts the unloading of row addressed data word R0 from partition 710 to output shifter 124E at the third read clock cycle. Each storage element that stores the row addressed data word R0 is located in a unique physical column. Therefore, row addressed data word R0 is fully exposed to output shifter 124E and may be unloaded to output shifter 124E in a single clock cycle.

Figure 21B:
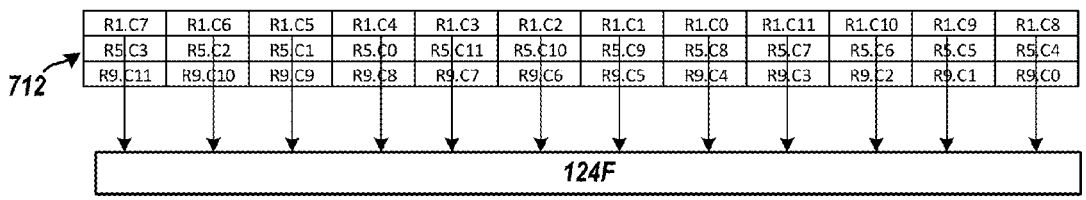

FIG. 21B depicts the unloading of row addressed data word R1 from partition 712 to output shifter 124F at the third read clock cycle. Each storage element that stores the row addressed data word R1 is located in a unique physical column. Therefore, row addressed data word R1 is fully exposed to output shifter 124F and may be unloaded to output shifter 124F in a single clock cycle.

Figure 21C:
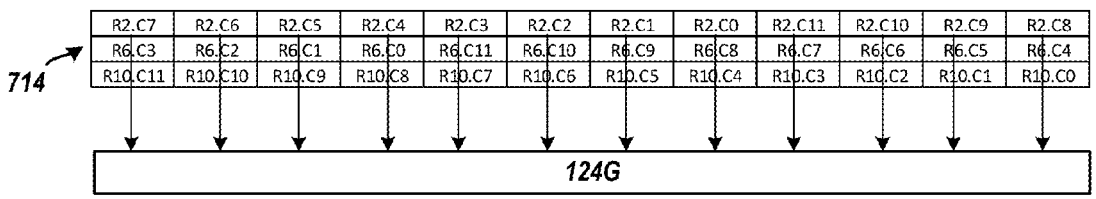

Likewise, FIG. 21C depicts the unloading of row addressed data word R2 from partition 714 to output shifter 124G at the third read clock cycle. Each storage element that stores the row addressed data word R2 is located in a unique physical column. Therefore, row addressed data word R2 is fully exposed to output shifter 124G and may be unloaded to output shifter 124G in a single clock cycle.

Figure 21D:
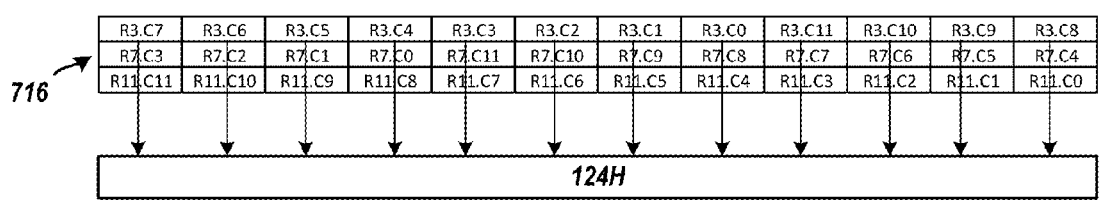

Likewise, FIG. 21D depicts the unloading of row addressed data word R3 from partition 716 to output shifter 124F at the third read clock cycle. Each storage element that stores the row addressed data word R3 is located in a unique physical column. Therefore, row addressed data word R3 is fully exposed to output shifter 124F and may be unloaded to output shifter 124F in a single clock cycle.

Therefore, the row addressed data words R0, R1, R2, and R3 may be provided to a requesting device simultaneously in a single clock cycle by output shifter 124E writing or otherwise providing data word R0, output shifter 124F writing or otherwise providing data word R1, output shifter 124G writing or otherwise providing data word R2, and output shifter 124F writing or otherwise providing data word R3 at the same clock cycle.

Prior to providing row addressed data word R0 to the requesting device, the output shifter 124E reverses the shift of the data word stored in storage element physical row zero to reform the row addressed data word R0. Likewise, prior to providing row addressed data word R1 to the requesting device, the output shifter 124F reverses the shift of the data word stored in storage element physical row one to reform the row addressed data word R1 Likewise, prior to providing row addressed data word R2 to the requesting device, the output shifter 124G reverses the shift of the data word stored in storage element physical row two to reform the row addressed data word R2 Likewise, prior to providing row addressed data word R3 to the requesting device, the output shifter 124H reverses the shift of the data word stored in storage element physical row three to reform the row addressed data word R3.

FIG. 22A-FIG. 22D depict simultaneously unloading or reading of column addressed data words from the multidimensional storage array 117 partitions at a first read clock cycle, according to embodiments of the present invention.

Figure 22A:
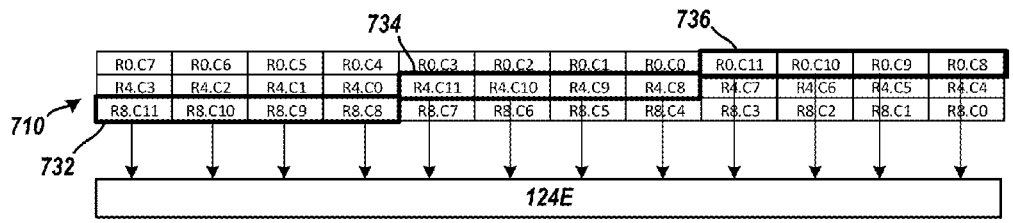
FIG. 22A-FIG. 22D depict reading of column addressed data words from the multidimensional storage array partitions at a first read clock cycle, according to embodiments of the present invention.

FIG. 22A depicts the unloading of C8-C11 column addressed data word segments 732, 734, and 736 from partition 710 to output shifter 124E at the first read clock cycle. C8-C11 column addressed data word segment 732 includes data addressed by R8C8, R8C9, R8C10, and R8C11 of column addressed data words C8, C9, C10, and C11. C8-C11 column addressed data word segment 734 includes data addressed by R4C8, R4C9, R4C 10, and R4C 11 of column addressed data words C8, C9, C10, and C11. C8-C11 column addressed data word segment 736 includes data addressed by R0C8, R0C9, R0C10, and R0C11 of column addressed data words C8, C9, C10, and C11. Each storage element that store the C8-C11 column addressed data word segments 732, 734, and 736 are located in a unique physical column of partition 710. Therefore, C8-C11 column addressed data word segments 732, 734, and 736 are exposed to output shifter 124E and may be unloaded to output shifter 124E in a single clock cycle.

Figure 22B:
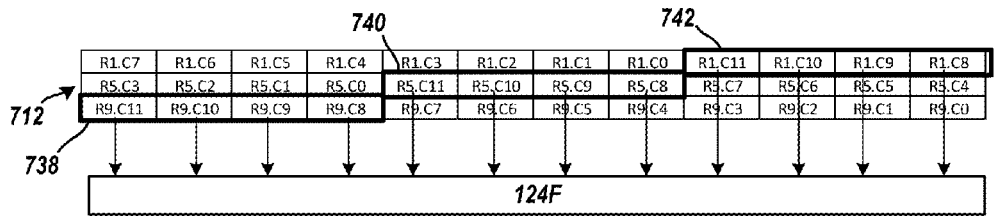

FIG. 22B depicts the unloading of C8-C11 column addressed data word segments 738, 740, and 742 from partition 712 to output shifter 124F at the first read clock cycle. C8-C11 column addressed data word segment 738 includes data addressed by R9C8, R9C9, R9C10, and R9C11 of column addressed data words C8, C9, C10, and C11. C8-C11 column addressed data word segment 740 includes data addressed by R5C8, R5C9, R5C10, and R5C11 of column addressed data words C8, C9, C10, and C11. C8-C11 column addressed data word segment 742 includes data addressed by R1C8, R1C9, R1C10, and R1C11 of column addressed data words C8, C9, C10, and C11. Each storage element that store the C8-C11 column addressed data word segments 738, 740, and 742 are located in a unique physical column of partition 712. Therefore, C8-C11 column addressed data word segments 738, 740, and 742 are exposed to output shifter 124F and may be unloaded to output shifter 124F in a single clock cycle.

Figure 22C:
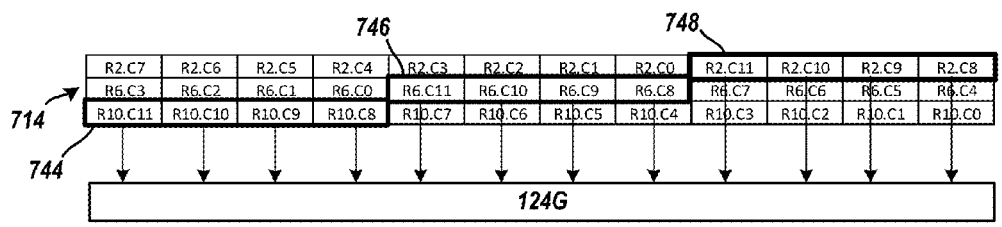

FIG. 22C depicts the unloading of C8-C11 column addressed data word segments 744, 746, and 748 from partition 714 to output shifter 124G at the first read clock cycle. C8-C11 column addressed data word segment 744 includes data addressed by R1008, R10C9, R10C10, and R10C11 of column addressed data words C8, C9, C10, and C11. C8-C11 column addressed data word segment 746 includes data addressed by R6C8, R6C9, R6C10, and R6C11 of column addressed data words C8, C9, C10, and C11. C8-C11 column addressed data word segment 748 includes data addressed by R2C8, R2C9, R2C10, and R2C11 of column addressed data words C8, C9, C10, and C11. Each storage element that store the C8-C11 column addressed data word segments 744, 746, and 748 are located in a unique physical column of partition 714. Therefore, C8-C11 column addressed data word segments 744, 746, and 748 are exposed to output shifter 124G and may be unloaded to output shifter 124G in a single clock cycle.

Figure 22D:
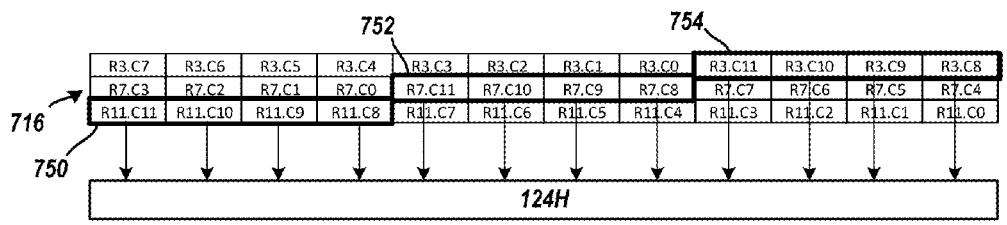

FIG. 22D depicts the unloading of C8-C11 column addressed data word segments 750, 752, and 754 from partition 716 to output shifter 124H at the first read clock cycle. C8-C11 column addressed data word segment 750 includes data addressed by R11C8, R11C9, R11C10, and R11C11 of column addressed data words C8, C9, C10, and C11. C8-C11 column addressed data word segment 752 includes data addressed by R7C8, R7C9, R7C10, and R7C11 of column addressed data words C8, C9, C10, and C11. C8-C11 column addressed data word segment 754 includes data addressed by R3C8, R3C9, R3C10, and R3C11 of column addressed data words C8, C9, C10, and C11. Each storage element that store the C8-C11 column addressed data word segments 750, 752, and 754 are located in a unique physical column of partition 716. Therefore, C8-C11 column addressed data word segments 750, 752, and 754 are exposed to output shifter 124H and may be unloaded to output shifter 124H in a single clock cycle.

The segments 732, 734, and 736 within partition 710, the segments 738, 740, 742 within partition 712, the segments 744, 746, and 748 within partition 714, and the segments 750, 752, and 754 within partition 716 may be loaded to the respective output shifter 124E-124H simultaneously in a single clock cycle.

Therefore, the column addressed data words C8, C9, C10, and C11 may be provided to a requesting device simultaneously in a single clock cycle by output shifter 124E writing or otherwise providing data word segments 732, 734, and 736 to the requesting device, output shifter 124F writing or otherwise providing data word segments 738, 740, and 742 to the requesting device, output shifter 124G writing or otherwise providing data word segments 744, 746, and 748 to the requesting device, and output shifter 124H writing or otherwise providing data word segments 750, 752, and 754 to the requesting device at the same clock cycle.

In the present depicted example, once the output shifter 124E receives the data word segments 732, 734, and 736 the output shifter 124E reverses the shift of input shifter 122E. Therefore, output shifter 124E shifts data word segment 734 by four positions within its physical row such that the data addressed by R4C11, R4C10, R4C9, and R4C8 vertically aligns with the data addressed by R8C11, R8C10, R8C9, and R8C8. Likewise, output shifter 124E shifts data word segment 736 by eight positions within its physical row physical row such that the data addressed by R0C11, R0C10, R0C9, and R0C8 vertically aligns with the data addressed by R8C11, R8C10, R8C9, and R8C8.

Similarly, once the output shifter 124F receives the data word segments 738, 740, and 742 the output shifter 124F reverses the shift of input shifter 122F. Therefore, output shifter 124F shifts data word segment 740 by four positions within its physical row such that the data addressed by R5C11, R5C10, R5C9, and R5C8 vertically aligns with the data addressed by R9C11, R9C10, R9C9, and R9C8. Likewise, output shifter 124F shifts data word segment 742 by eight positions within its physical row such that the data addressed by R1C11, R1C10, R1C9, and R1C8 vertically aligns with the data addressed by R9C11, R9C10, R9C9, and R9C8.

Likewise, once the output shifter 124G receives the data word segments 744, 746, and 748 the output shifter 124G reverses the shift of input shifter 122G. Therefore, output shifter 124G shifts data word segment 746 by four positions within its physical row such that the data addressed by R6C11, R6C10, R6C9, and R6C8 vertically aligns with the data addressed by R10C11, R10C10, R10C9, and R1008. Likewise, output shifter 124G shifts data word segment 748 by eight positions within its physical row such that the data addressed by R2C11, R2C10, R2C9, and R2C8 vertically aligns with the data addressed by R10C11, R10C10, R10C9, and R10C8.

Likewise, once the output shifter 124H receives the data word segments 750, 752, and 754 the output shifter 124H reverses the shift of input shifter 122H. Therefore, output shifter 124H shifts data word segment 752 by four positions within its physical row such that the data addressed by R7C11, R7C10, R7C9, and R7C8 vertically aligns with the data addressed by R11C11, R11C10, R11C9, and R11C8. Likewise, output shifter 124H shifts data word segment 754 by eight positions within its physical row such that the data addressed by R3C11, R3C10, R3C9, and R3C8 vertically aligns with the data addressed R11C11, R11C10, R11C9, and R11C8.

As a result of the shifting respective data word segments by output shifters 124E-124H, column addressed data words C8, C9, C10, and C11 are reformed by the output shifters 124E-124H passing the respective shifted data word segments to the requesting device simultaneously in a single clock cycle.

The data word segments 732, 734, and 736 are physically diagonally arranged within partition 710, data word segments 738, 740, and 742 are physically diagonally arranged within partition 712, data word segments 744, 746, and 748 are physically diagonally arranged within partition 714, data word segments 750, 752, and 754 are physically diagonally arranged within partition 124H.

FIG. 23A-FIG. 23D depict simultaneously unloading or reading of column addressed data words from the multidimensional storage array 117 partitions at a subsequent second read clock cycle, according to embodiments of the present invention.

Figure 23A:
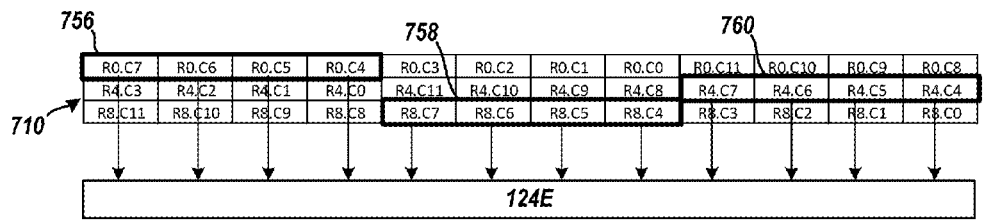
FIG. 23A-FIG. 23D depict reading of column addressed data words from the multidimensional storage array partitions at a second read clock cycle, according to embodiments of the present invention.

FIG. 23A depicts the unloading of C4-C7 column addressed data word segments 756, 758, and 760 from partition 710 to output shifter 124E at the second read clock cycle. C4-C7 column addressed data word segment 756 includes data addressed by R0C4, R0C5, R0C6, and R0C4 of column addressed data words C4, C5, C6, and C7. C4-C7 column addressed data word segment 758 includes data addressed by R8C4, R8C5, R8C6, and R8C7 of column addressed data words C4, C5, C6, and C7. C4-C7 column addressed data word segment 760 includes data addressed by R4C4, R4C5, R4C6, and R4C7 of column addressed data words C4, C5, C6, and C7. Each storage element that store the C4-C7 column addressed data word segments 756, 758, and 760 are located in a unique physical column of partition 710. Therefore, C4-C7 column addressed data word segments 756, 758, and 760 are exposed to output shifter 124E and may be unloaded to output shifter 124E in a single clock cycle.

Figure 23B:
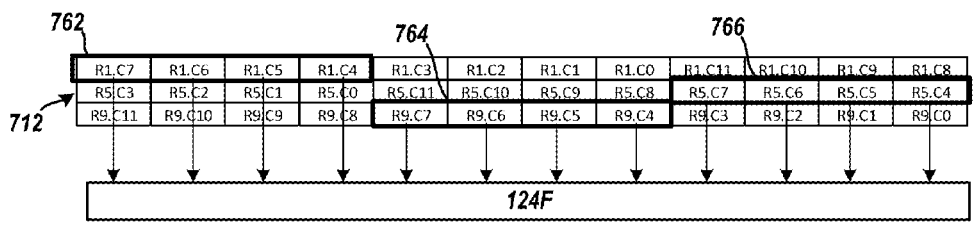

FIG. 23B depicts the unloading of C4-C7 column addressed data word segments 762, 764, and 766 from partition 712 to output shifter 124F at the second read clock cycle. C4-C7 column addressed data word segment 762 includes data addressed by R1C4, R1C5, R1C6, and R1C7 of column addressed data words C4, C5, C6, and C7. C4-C7 column addressed data word segment 764 includes data addressed by R9C4, R9C5, R9C6, and R9C7 of column addressed data words C4, C5, C6, and C7. C4-C7 column addressed data word segment 766 includes data addressed by R5C4, R5C5, R5C6, and R5C7 of column addressed data words C4, C5, C6, and C7. Each storage element that store the C4-C7 column addressed data word segments 762, 764, and 766 are located in a unique physical column of partition 712. Therefore, C4-C7 column addressed data word segments 762, 764, and 766 are exposed to output shifter 124F and may be unloaded to output shifter 124F in a single clock cycle.

Figure 23C:
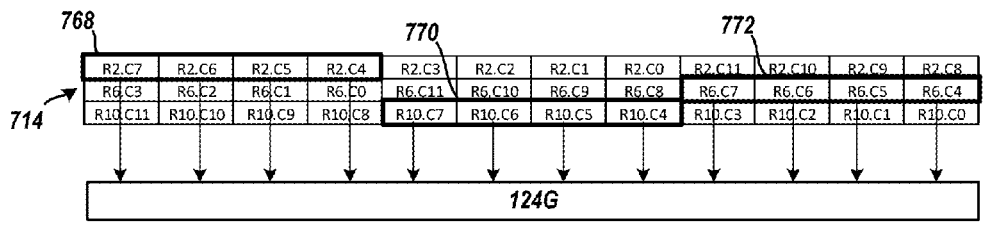

FIG. 23C depicts the unloading of C4-C7 column addressed data word segments 768, 770, and 772 from partition 714 to output shifter 124G at the second read clock cycle. C4-C7 column addressed data word segment 768 includes data addressed by R2C4, R2C5, R2C6, and R2C7 of column addressed data words C4, C5, C6, and C7. C4-C7 column addressed data word segment 770 includes data addressed by R10C4, R10C5, R10C6, and R10C7 of column addressed data words C4, C5, C6, and C7. C4-C7 column addressed data word segment 772 includes data addressed by R6C4, R6C5, R6C6, and R6C7 of column addressed data words C4, C5, C6, and C7. Each storage element that store the C4-C7 column addressed data word segments 768, 770, and 772 are located in a unique physical column of partition 714. Therefore, C4-C7 column addressed data word segments 768, 770, and 772 are exposed to output shifter 124G and may be unloaded to output shifter 124G in a single clock cycle.

Figure 23D:
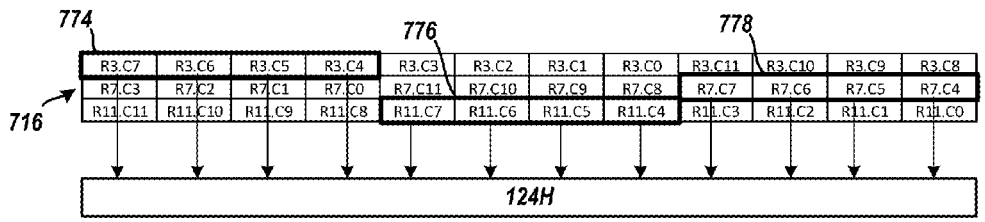

FIG. 23D depicts the unloading of C4-C7 column addressed data word segments 774, 776, and 778 from partition 716 to output shifter 124H at the second read clock cycle. C4-C7 column addressed data word segment 774 includes data addressed by R3C4, R3C5, R3C6, and R3C7 of column addressed data words C4, C5, C6, and C7. C4-C7 column addressed data word segment 776 includes data addressed by R11C4, R11C5, R11C6, and R11C7 of column addressed data words C4, C5, C6, and C7. C4-C7 column addressed data word segment 778 includes data addressed by R7C4, R7C5, R7C6, and R7C7 of column addressed data words C4, C5, C6, and C7. Each storage element that store the C4-C7 column addressed data word segments 774, 776, and 778 are located in a unique physical column of partition 716. Therefore, C4-C7 column addressed data word segments 774, 776, and 778 are exposed to output shifter 124H and may be unloaded to output shifter 124H in a single clock cycle.

The segments 756, 758, and 760 within partition 710, the segments 762, 764, and 766 within partition 712, the segments 768, 770, and 772 within partition 714, and the segments 774, 776, and 778 within partition 716 may be loaded to the respective output shifter 124E-124H simultaneously in a single clock cycle.

Therefore, the column addressed data words C4, C5, C6, and C7 may be provided to a requesting device simultaneously in a single clock cycle by output shifter 124E writing or otherwise providing data word segments 756, 758, and 760 to the requesting device, output shifter 124F writing or otherwise providing data word segments 762, 764, and 766 to the requesting device, output shifter 124G writing or otherwise providing data word segments 768, 770, and 772 to the requesting device, and output shifter 124H writing or otherwise providing data word segments 774, 776, and 778 to the requesting device at the same clock cycle.

In the present depicted example, once the output shifter 124E receives the data word segments 756, 758, and 760 the output shifter 124E reverses the shift of input shifter 122E. Therefore, output shifter 124E shifts data word segment 760 by four positions within its physical row such that the data addressed by R4C7, R4C6, R4C5, and R4C4 vertically aligns with the data addressed by R8C7, R8C6, R8C5, and R8C4. Likewise, output shifter 124E shifts data word segment 756 by eight positions within its physical row physical row such that the data addressed by R0C7, R0C6, R0C5, and R0C4 vertically aligns with the data addressed by R8C7, R8C6, R8C5, and R8C4.

Similarly, once the output shifter 124F receives the data word segments 762, 764, and 766 the output shifter 124F reverses the shift of input shifter 122F. Therefore, output shifter 124F shifts data word segment 766 by four positions within its physical row such that the data addressed by R5C7, R5C6, R5C5, and R5C4 vertically aligns with the data addressed by R9C7, R9C7, R9C7, and R9C7. Likewise, output shifter 124F shifts data word segment 762 by eight positions within its physical row such that the data addressed by R1C7, R1C6, R1C5, and R1C4 vertically aligns with the data addressed by R9C7, R9C7, R9C7, and R9C7.

Likewise, once the output shifter 124G receives the data word segments 768, 770, and 772 the output shifter 124G reverses the shift of input shifter 122G. Therefore, output shifter 124G shifts data word segment 772 by four positions within its physical row such that the data addressed by R6C7, R6C6, R6C5, and R6C4 vertically aligns with the data addressed by R10C7, R10C6, R10C5, and R10C4. Likewise, output shifter 124G shifts data word segment 768 by eight positions within its physical row such that the data addressed by R2C7, R2C6, R2C5, and R2C4 vertically aligns with the data addressed by R10C7, R10C6, R10C5, and R10C4.

Likewise, once the output shifter 124H receives the data word segments 774, 776, and 778 the output shifter 124H reverses the shift of input shifter 122H. Therefore, output shifter 124H shifts data word segment 778 by four positions within its physical row such that the data addressed by R7C7, R7C6, R7C5, and R7C4 vertically aligns with the data addressed by R11C7, R11C6 R11C5, and R11C4. Likewise, output shifter 124H shifts data word segment 774 by eight positions within its physical row such that the data addressed by R3C7, R3C6, R3C5, and R3C4 vertically aligns with the data addressed R11C7, R11C6, R11C5, and R11C4.

As a result of the shifting of respective data word segments by output shifters 124E-124H, column addressed data words C4, C5, C6, and C7 are reformed by the output shifters 124E-124H passing the respective shifted data word segments to the requesting device simultaneously in a single clock cycle.

The data word segments 756, 758, and 760 are circularly physically diagonally arranged within partition 710, data word segments 762, 764, and 766 are circularly physically diagonally arranged within partition 712, data word segments 768, 770, and 772 are physically circularly diagonally arranged within partition 714, data word segments 774, 776, and 778 are circularly physically diagonally arranged within partition 124H.

FIG. 24A-FIG. 24D depict simultaneously unloading or reading of column addressed data words from the multidimensional storage array 117 partitions at a subsequent second read clock cycle, according to embodiments of the present invention.

Figure 24A:
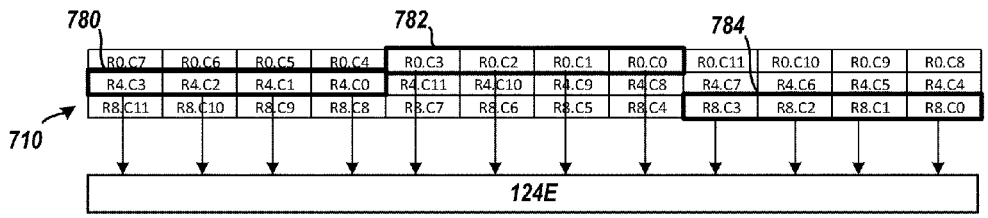
FIG. 24A-FIG. 24D depict reading of column addressed data words from the multidimensional storage array partitions at a third read clock cycle, according to embodiments of the present invention.

FIG. 24A depicts the unloading of C0-C3 column addressed data word segments 780, 782, and 784 from partition 710 to output shifter 124E at the third read clock cycle. C0-C3 column addressed data word segment 780 includes data addressed by R4C3, R4C2, R4C1, and R4C1 of column addressed data words C0, C1, C2, and C3. C0-C3 column addressed data word segment 782 includes data addressed by R0C5, R0C2, R0C1, and R0C0 of column addressed data words C0, C1, C2, and C3. C0-C3 column addressed data word segment 784 includes data addressed by R8C3, R8C2, R8C1, and R8C0 of column addressed data words C0, C1, C2, and C3. Each storage element that store the C0-C3 column addressed data word segments 780, 782, and 784 are located in a unique physical column of partition 710. Therefore, C0-C3 column addressed data word segments 780, 782, and 784 are exposed to output shifter 124E and may be unloaded to output shifter 124E in a single clock cycle.

Figure 24B:
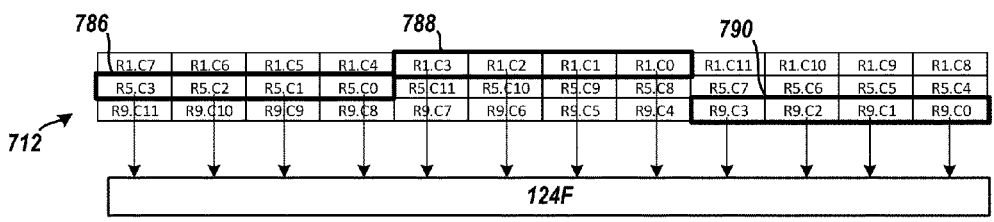

FIG. 24B depicts the unloading of C0-C3 column addressed data word segments 786, 788, and 790 from partition 712 to output shifter 124F at the third read clock cycle. C0-C3 column addressed data word segment 786 includes data addressed by R5C3, R5C2, R5C1, and R5C1 of column addressed data words C0, C1, C2, and C3. C0-C3 column addressed data word segment 788 includes data addressed by R1C3, R1C2, R1C1, and RICO of column addressed data words C0, C1, C2, and C3. C0-C3 column addressed data word segment 790 includes data addressed by R9C3, R9C2, R9C1, and R9C0 of column addressed data words C0, C1, C2, and C3. Each storage element that store the C0-C2 column addressed data word segments 786, 788, and 790 are located in a unique physical column of partition 712. Therefore, C0-C3 column addressed data word segments 786, 788, and 790 are exposed to output shifter 124F and may be unloaded to output shifter 124F in a single clock cycle.

Figure 24C:
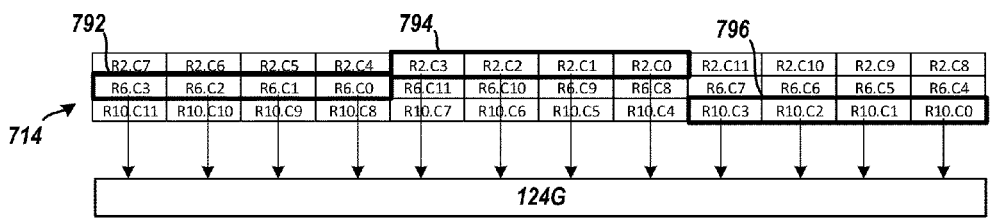

FIG. 24C depicts the unloading of C0-C3 column addressed data word segments 792, 794, and 796 from partition 714 to output shifter 124G at the third read clock cycle. C0-C3 column addressed data word segment 792 includes data addressed by R6C3, R6C2, R6C1, and R6C1 of column addressed data words C0, C1, C2, and C3. C0-C3 column addressed data word segment 794 includes data addressed by R2C3, R2C2, R2C1, and R2C0 of column addressed data words C0, C1, C2, and C3. C0-C3 column addressed data word segment 796 includes data addressed by R10C3, R10C2, R10C1, and R10C0 of column addressed data words C0, C1, C2, and C3. Each storage element that store the C0-C2 column addressed data word segments 792, 794, and 796 are located in a unique physical column of partition 714. Therefore, C0-C3 column addressed data word segments 792, 794, and 796 are exposed to output shifter 124G and may be unloaded to output shifter 124G in a single clock cycle.

Figure 24D:
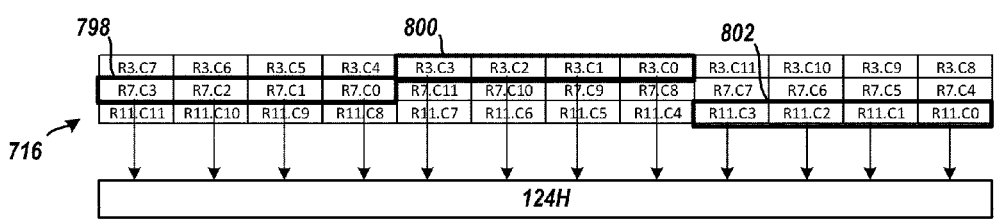

FIG. 24D depicts the unloading of C0-C3 column addressed data word segments 798, 800, and 802 from partition 716 to output shifter 124H at the third read clock cycle. C0-C3 column addressed data word segment 798 includes data addressed by R7C3, R7C2, R7C1, and R7C1 of column addressed data words C0, C1, C2, and C3. C0-C3 column addressed data word segment 800 includes data addressed by R3C3, R3C2, R3C1, and R3C0 of column addressed data words C0, C1, C2, and C3. C0-C3 column addressed data word segment 802 includes data addressed by R11C3, R11C2, R11C1, and R11C0 of column addressed data words C0, C1, C2, and C3. Each storage element that store the C0-C2 column addressed data word segments 798, 800, and 802 are located in a unique physical column of partition 716. Therefore, C0-C3 column addressed data word segments 798, 800, and 802 are exposed to output shifter 124H and may be unloaded to output shifter 124H in a single clock cycle.

The segments 780, 782, and 784 within partition 710, the segments 786, 788, and 790 within partition 712, the segments 792, 794, and 796 within partition 714, and the segments 798, 800, and 802 within partition 716 may be loaded to the respective output shifter 124E-124H simultaneously in a single clock cycle.

Therefore, the column addressed data words C0, C1, C2, and C3 may be provided to a requesting device simultaneously in a single clock cycle by output shifter 124E writing or otherwise providing data word segments 780, 782, and 784 to the requesting device, output shifter 124F writing or otherwise providing data word segments 786, 788, and 790 to the requesting device, output shifter 124G writing or otherwise providing data word segments 792, 794, and 796 to the requesting device, and output shifter 124H writing or otherwise providing data word segments 798, 800, and 802 to the requesting device at the same clock cycle.

In the present depicted example, once the output shifter 124E receives the data word segments 780, 782, and 784 the output shifter 124E reverses the shift of input shifter 122E. Therefore, output shifter 124E shifts data word segment 780 by four positions within its physical row such that the data addressed by R4C3, R4C2, R4C1, and R4C0 vertically aligns with the data addressed by R8C3, R8C2, R8C1, and R8C0. Likewise, output shifter 124E shifts data word segment 782 by eight positions within its physical row physical row such that the data addressed by R0C3, R0C2, R0C1, and R0C0 vertically aligns with the data addressed by R8C3, R8C2, R8C1, and R8C0.

Similarly, once the output shifter 124F receives the data word segments 786, 788, and 790 the output shifter 124F reverses the shift of input shifter 122F. Therefore, output shifter 124F shifts data word segment 786 by four positions within its physical row such that the data addressed by R5C3, R5C2, R5C1, and R5C0 vertically aligns with the data addressed by R9C3, R9C2, R9C1, and R9C0. Likewise, output shifter 124F shifts data word segment 788 by eight positions within its physical row such that the data addressed by R1C3, R1C2, R1C1, and R1C0 vertically aligns with the data addressed by R9C3, R9C2, R9C1, and R9C0.

Likewise, once the output shifter 124G receives the data word segments 792, 794, and 796 the output shifter 124G reverses the shift of input shifter 122G. Therefore, output shifter 124G shifts data word segment 792 by four positions within its physical row such that the data addressed by R6C3, R6C2, R6C1, and R6C0 vertically aligns with the data addressed by R10C3, R10C2, R10C1, and R10C0. Likewise, output shifter 124G shifts data word segment 794 by eight positions within its physical row such that the data addressed by R2C3, R2C2, R2C1, and R2C0 vertically aligns with the data addressed by R10C3, R10C2, R10C1, and R10C0.

Likewise, once the output shifter 124H receives the data word segments 798, 800, and 802 the output shifter 124H reverses the shift of input shifter 122H. Therefore, output shifter 124H shifts data word segment 798 by four positions within its physical row such that the data addressed by R7C3, R7C2, R7C1, and R7C0 vertically aligns with the data addressed by R11C3, R11C2 R11C1, and R11C0. Likewise, output shifter 124H shifts data word segment 800 by eight positions within its physical row such that the data addressed by R3C3, R3C2, R3C1, and R3C0 vertically aligns with the data addressed R11C3, R11C2, R11C1, and R11C0.

As a result of the shifting of respective data word segments by output shifters 124E-124H, column addressed data words C0, C1, C2, and C3 are reformed by the output shifters 124E-124H passing the respective shifted data word segments to the requesting device simultaneously in a single clock cycle.

The data word segments 780, 782, and 784 are circularly physically diagonally arranged within partition 710, data word segments 786, 788, and 790 are circularly physically diagonally arranged within partition 712, data word segments 792, 794, and 796 are physically circularly diagonally arranged within partition 714, and data word segments 798, 800, and 802 are circularly physically diagonally arranged within partition 124H.

Figure 25:
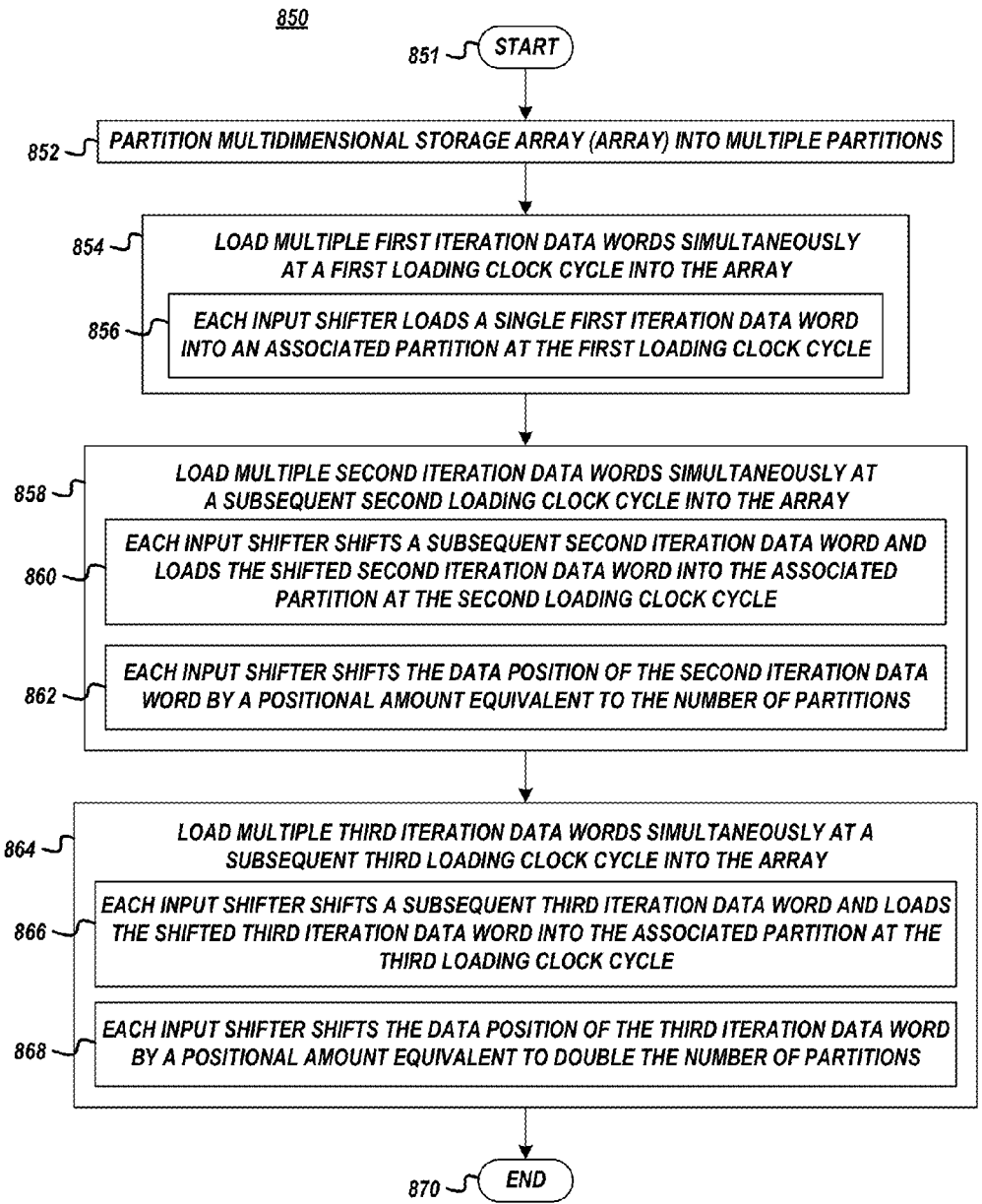
FIG. 25 depicts a method of simultaneously loading multiple data words from multiple input shifters into a partitioned multidimensional storage array in a single clock cycle, according to embodiments of the present invention.

FIG. 25 depicts a method 850 of simultaneously loading multiple data words from multiple input shifters into a partitioned multidimensional storage array, according to embodiments of the present invention. For example, method 850 may be utilized to simultaneously load multiple row addressed data words or load multiple column addressed data words into partitioned multidimensional storage array 117 in a single clock cycle.

Method 850 begins at block 851 and continues with partitioning a multidimensional storage array into multiple partitions (block 852). For example, a processor 101, array manage 118, etc. may partition a multidimensional storage array to form storage array 117. Each partition of the storage array 117 may include particular unique physical rows or columns. Each physical row or column of each partition may be equally separated. For example, partition 710 may include physical rows of array 117 that are separated by a position equal to the number of partitions. If array 117 is partitioned into four partitions, partition 710 may exemplarily include physical row zero of array 117, physical row four of array 117, and physical row eight of array 117, partition 712 may exemplarily include physical row one of array 117, physical row five of array 117, and physical row nine of array 117, etc.

Method 850 may continue by multiple input shifters 122 loading multiple first iteration data words simultaneously into the array at a first loading clock cycle (block 854). Generally, the number of input shifters equals the number of partitions of the array, such that a particular input shifter 122 is communicatively connected to a particular partition. For example, if array 117 includes four partitions, 710, 712, 714, and 716, those partitions are each individually associated with a particular input shifter 122E-122H. Each input shifter 122 may load an entire data word in it's entirely into the associated partition at the first loading clock cycle (block 856). For example, if each partition consists of physical rows of storage elements, each input shifter may load a single entire row addressed data word into the associated partition. Since there are multiple input shifters and because each input shift loads a single entire data word into the associated partition at the first loading clock cycle, in total, multiple data words are loaded into the array 117 at the first loading clock cycle.

Method 850 may continue by multiple input shifters 122 loading multiple second iteration data words simultaneously into the array at a second loading clock cycle (block 858). Prior to loading the multiple second iteration data words simultaneously into the array, each input shifter 122 shifts its second iteration data word (block 860). The input shifter 122 shifts its second iteration data word by circularly shifting the relative data positions of its second iteration data word by an amount equal to the number of partitions (block 862). For example, if array 117 includes four partitions, each input shifter 122E-122H shifts its second iteration data word by four positions.

Method 850 may continue by multiple input shifters 122 loading multiple third iteration data words simultaneously into the array at a third loading clock cycle (block 864). Prior to loading the multiple third iteration data words simultaneously into the array, each input shifter 122 shifts its third iteration data word (block 866). The input shifter 122 shifts its third iteration data word by circularly shifting the relative data positions of its third iteration data word by an amount equal to two times the number of partitions (block 868). For example, if array 117 includes four partitions, each input shifter 122E-122H shifts its third iteration data word by eight positions. Method 850 ends at block 870.

Figure 26:
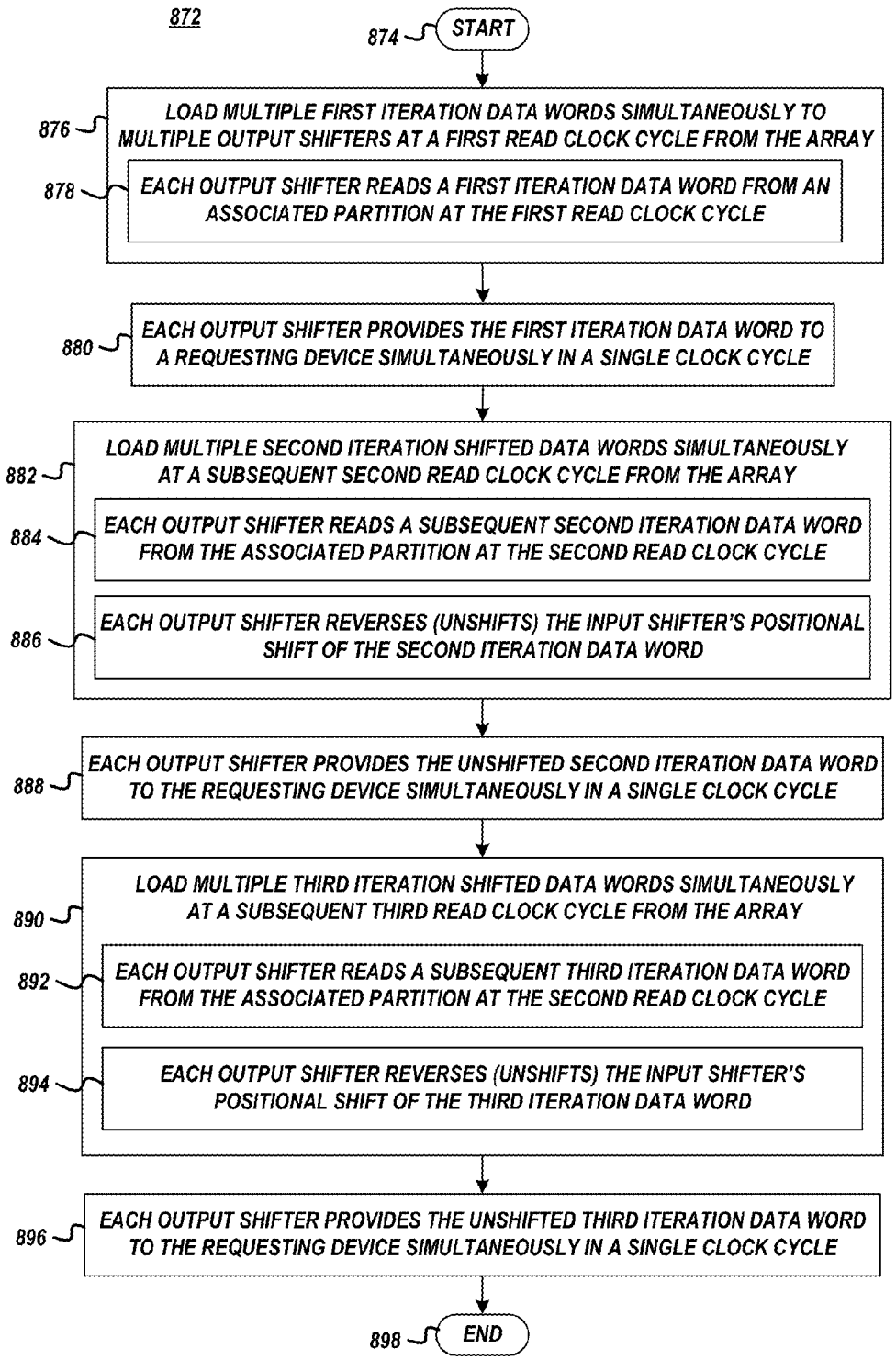
FIG. 26 and FIG. 27 depict methods of simultaneously unloading multiple data words from a partitioned multidimensional storage array to multiple output shifters in a single clock cycle, according to embodiments of the present invention.

FIG. 26 depicts a method 872 of simultaneously unloading multiple data words from a partitioned multidimensional storage array to multiple output shifters, according to embodiments of the present invention. Method 872 may be utilized to unload a data word of the same orientation as the partition's physical storage elements from each partition of the array in a single clock cycle. For example, if each partition of the array includes row orientated storage elements, method 872 may be utilized by each of the multiple output shifters to unload a shifted row addressed data word from an associated partition.

Method 872 begins at block 874 and continues with loading multiple first iteration data words simultaneously at a first read clock cycle from the array to multiple output shifters (block 876). Generally, the number of output shifters equals the number of partitions of the array, such that a particular output shifter is communicatively connected to a particular partition. For example, if array 117 includes four partitions, 710, 712, 714, and 716, those partitions are each individually associated with a particular output shifter 124E-124H. By each particular output shifter simultaneously reading a first iteration data word from its associated partition at the first read clock cycle (block 878), multiple first iteration data words are read simultaneously from array 117 at the first read clock cycle.

Method 872 may continue by each output shifter providing its first iteration data word to a requesting device simultaneously in a single clock cycle (block 880). For example, output shifters 124E-124H may each provide its row addressed data word that was read from its associated partition to decoder 126 simultaneously in a single clock cycle.

Method 872 may continue with loading multiple second iteration shifted data words simultaneously at a second read clock cycle from the array to multiple output shifters (block 882). For example, each output shifter 124E-124H may each read a second iteration shifted data word from its associated partition at the second read clock cycle (block 884). Each output shifter 124E-124H reverses the shift performed by the respective input shifter 122E-122H to the second iteration shifted data word (block 886). For example, each output shifter 124E-124H reverses the shift of the read second iteration shifted data word by shifting the read second iteration shifted data word by four positions to effectively reform the data word to that which existed prior to the respective input shifter 122E-122H performing the shift thereupon.

Method 872 may continue by each output shifter providing its unshifted second iteration data word to the requesting device simultaneously in a single clock cycle (block 888). For example, each output shifter 124E-124H provides its unshifted second iteration data word to the decoder 126 simultaneously in a single clock cycle.

Method 872 may continue with loading multiple third iteration shifted data words simultaneously at a third read clock cycle from the array to multiple output shifters (block 890). For example, each output shifter 124E-124H may each read a third iteration shifted data word from its associated partition at the third read clock cycle (block 892). Each output shifter 124E-124H reverses the shift performed by the respective input shifter 122E-122H to the read third iteration shifted data word (block 894). For example, each output shifter 124E-124H reverses the shift of its read third iteration shifted data word by shifting the third iteration shifted data word by eight positions to effectively reform the data word to that which existed prior to the respective input shifter 122E-122H performing the shift thereupon.

Method 872 may continue by each output shifter providing its unshifted third iteration data word to the requesting device simultaneously in a single clock cycle (block 896). For example, each output shifter 124E-124H provides its unshifted third iteration data word to the decoder 126 simultaneously in a single clock cycle. Method 872 ends at block 898.

Figure 27:
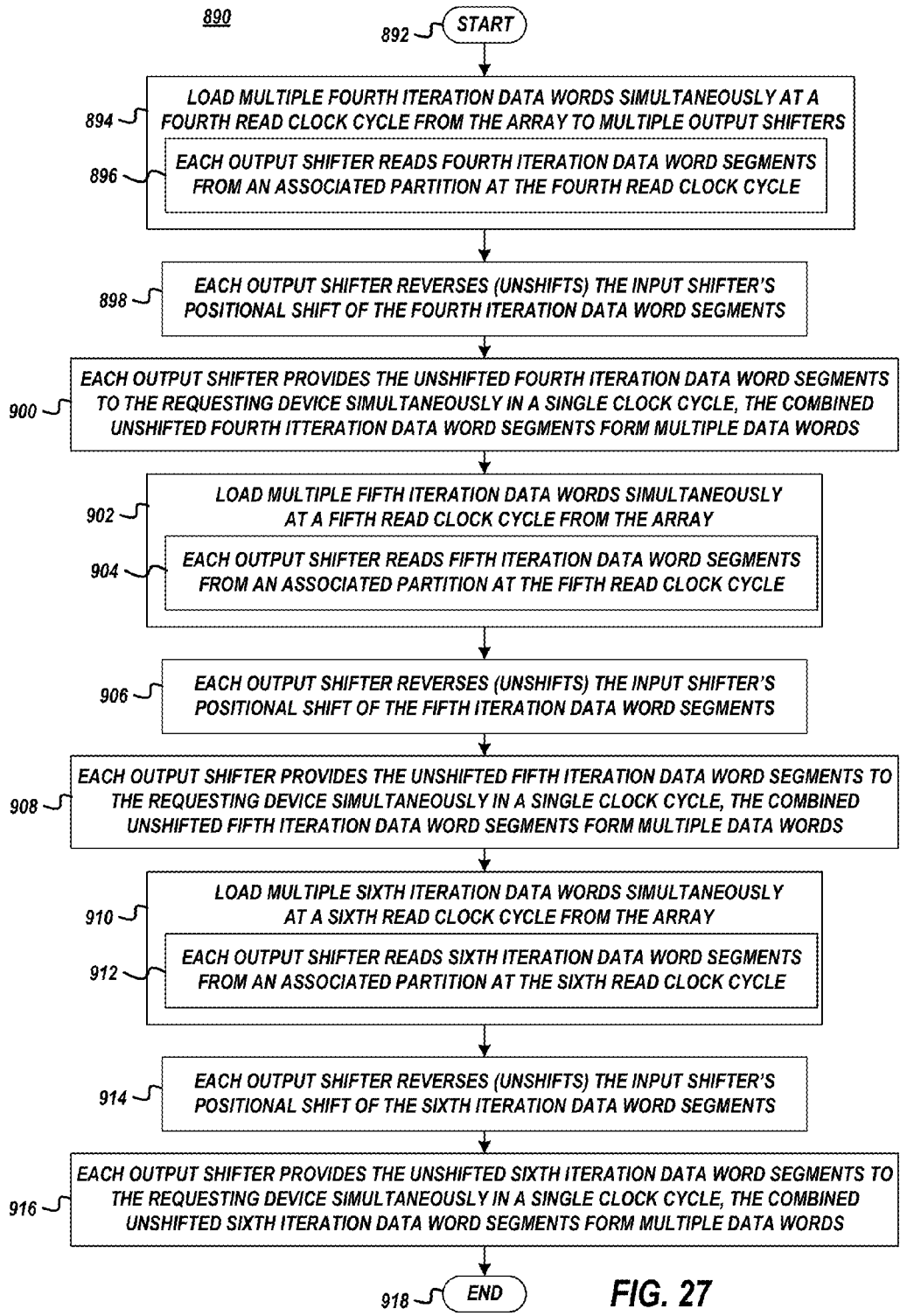

FIG. 27 depicts a method 890 of simultaneously unloading multiple data words from a partitioned multidimensional storage array to multiple output shifters, according to embodiments of the present invention. Method 890 may be utilized to unload a data word of the orthogonal orientation as the partition's physical storage elements from each partition of the array in a single clock cycle. For example, if each partition of the array includes row orientated storage elements, method 890 may be utilized by the output shifters to unload multiple column addressed data words from the array. In certain embodiments, method 890 may be performed subsequent to method 872. Therefore, the iteration number is serially continued from method 872.

Method 890 begins at block 892 and continues with the loading of multiple fourth iteration data words simultaneously from the array to multiple output shifters at a fourth read clock cycle (block 894). As opposed to a single data word in it's entirely being loaded from an array partition to the associated output shifter, segments of the fourth iteration data words are loaded from each array partition to the associated output shifter (block 896). For example, segments 732, 734, and 736 are loaded from partition 710 to output shifter 124E simultaneously at the fourth iteration clock cycle, segments 738, 740, and 742 are loaded from partition 712 to output shifter 124F simultaneously at the fourth iteration clock cycle, etc.

Method 890 may continue with each output shifter reversing or unshifting the input shifter's positional shift upon the read fourth iteration data word segments (block 898). For example, the output shifter 124E vertically aligns segments 732, 734, and 736 such that R8C11 addressed data is vertically aligned with the R4C11 addressed data and is vertically aligned with the R0C11 addressed data, the R8C10 addressed data is vertically aligned with the R4C10 addressed data and is vertically aligned with the R0C10 addressed data, the R8C9 addressed data is vertically aligned with the R4C9 addressed data and is vertically aligned with the R0C9 addressed data, and the R8C8 addressed data is vertically aligned with the R4C8 addressed data and is vertically aligned with the R0C8 addressed data. For clarity, each output shifter 124E-124F aligns the particular fourth iteration data word segments read from its partition.

Method 890 may continue by each output shifter providing its unshifted or aligned fourth iteration data word segments to the requesting device simultaneously in a single clock cycle (block 900). When combined, the data word segments from each output shifter form multiple data words. For example, the vertically aligned data word segments 732, 734, and 736 provided by output shifter 124E to decoder 126, the vertically aligned data word segments 738, 740, and 742 provided by output shifter 124F to decoder 126, the vertically aligned data word segments 744, 746, and 748 provided by output shifter 124G to decoder 126, and the vertically aligned data word segments 750, 752, and 754 provided by output shifter 124E to decoder 126 form column addressed data words C8-C11 in decoder 126.

Method 890 may continue with loading of multiple fifth iteration data words simultaneously from the array to multiple output shifters at a fifth read clock cycle (block 902). Similar to the fourth iteration data words, segments of the fourth iteration data words are loaded from each array partition to the associated output shifter (block 904). For example, segments 756, 758, and 760 are loaded from partition 710 to output shifter 124E simultaneously at the fifth iteration clock cycle, segments 762, 764, and 766 are loaded from partition 712 to output shifter 124F simultaneously at the fifth iteration clock cycle, etc.

Method 890 may continue with each output shifter reversing or unshifting the input shifter's positional shift upon its read fifth iteration data word segments (block 906). For example, the output shifter 124E vertically aligns segments 756, 758, and 760 such that R8C7 addressed data is vertically aligned with the R4C7 addressed data and is vertically aligned with the R0C7 addressed data, the R8C6 addressed data is vertically aligned with the R4C6 addressed data and is vertically aligned with the R0C6 addressed data, the R8C5 addressed data is vertically aligned with the R4C5 addressed data and is vertically aligned with the R0C5 addressed data, and the R8C4 addressed data is vertically aligned with the R4C4 addressed data and is vertically aligned with the R0C4 addressed data. For clarity, each output shifter 124E-124F aligns the particular fifth iteration data word segments read from its partition.

Method 890 may continue by each output shifter providing its unshifted or aligned fifth iteration data word segments to the requesting device simultaneously in a single clock cycle (block 908). When combined, the data word segments from each output shifter form multiple data words. For example, the vertically aligned data word segments 756, 758, and 760 provided by output shifter 124E to decoder 126, the vertically aligned data word segments 762, 764, and 766 provided by output shifter 124F to decoder 126, the vertically aligned data word segments 768, 770, and 772 provided by output shifter 124G to decoder 126, and the vertically aligned data word segments 774, 776, and 778 provided by output shifter 124E to decoder 126 form column addressed data words C4-C7 in decoder 126.

Method 890 may continue with loading of multiple sixth iteration data words simultaneously from the array to multiple output shifters at a sixth read clock cycle (block 910). Similar to the fifth iteration data words, segments of the sixth iteration data words are loaded from each array partition to the associated output shifter (block 912). For example, segments 780, 782, and 784 are loaded from partition 710 to output shifter 124E simultaneously at the sixth iteration clock cycle, segments 786, 788, and 790 are loaded from partition 712 to output shifter 124F simultaneously at the sixth iteration clock cycle, etc.

Method 890 may continue with each output shifter reversing or unshifting the input shifter's positional shift upon its read sixth iteration data word segments (block 914). For example, the output shifter 124E vertically aligns segments 780, 782, and 784 such that R8C3 addressed data is vertically aligned with the R4C3 addressed data and is vertically aligned with the R0C3 addressed data, the R8C2 addressed data is vertically aligned with the R4C2 addressed data and is vertically aligned with the R0C2 addressed data, the R8C1 addressed data is vertically aligned with the R4C1 addressed data and is vertically aligned with the R0C1 addressed data, and the R8C0 addressed data is vertically aligned with the R4C0 addressed data and is vertically aligned with the R0C0 addressed data. For clarity, each output shifter 124E-124F aligns the particular sixth iteration data word segments read from its partition.

Method 890 may continue by each output shifter providing its unshifted or aligned sixth iteration data word segments to the requesting device simultaneously in a single clock cycle (block 916). When combined, the data word segments from each output shifter form multiple data words. For example, the vertically aligned data word segments 780, 782, and 784 provided by output shifter 124E to decoder 126, the vertically aligned data word segments 786, 788, and 790 provided by output shifter 124F to decoder 126, the vertically aligned data word segments 792, 794, and 796 provided by output shifter 124G to decoder 126, and the vertically aligned data word segments 798, 800, and 802 provided by output shifter 124E to decoder 126 form column addressed data words C0-C3 in decoder 126. Method 890 ends at block 918

The accompanying figures and this description depicted and described embodiments of the present invention, and features and components thereof. Those skilled in the art will appreciate that any particular nomenclature used in this description was merely for convenience, and thus the invention should not be limited by the specific process identified and/or implied by such nomenclature. Therefore, it is desired that the embodiments described herein be considered in all respects as illustrative, not restrictive, and that reference be made to the appended claims for determining the scope of the invention.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A multidimensional storage array system comprising:
a multidimensional storage array comprising a plurality of storage elements physically arranged in a plurality of rows and a plurality of columns that each store particular bit(s) of a data word;
a plurality of storage array partitions, each storage array partition comprising a plurality of rows, each row comprising a plurality of row orientated storage elements;
a plurality of input shifters, each input shifter associated with a unique storage array partition, wherein each input shifter implements a shift upon received data words and serially loads the shifted data words to the associated storage array partition via a storage array input interface filling the multidimensional storage array with multiple row addressed data words and multiple column addressed data words, wherein column addressed data word segments and row addressed data words are exposed within each storage array partition, and;
a storage array output interface to unload the shifted data words from the multidimensional storage array;
a plurality of output shifters, each output shifter associated with a unique storage array partition, each output shifter unloads from an associated partition and reverses the shift of a requested row addressed data word and unloads from the associated partition and reverses the shift of a plurality of column addressed data word segments associated with a requested column addressed data word; wherein multiple requested row addressed data words are unloaded by the plurality of output shifters simultaneously in a single clock cycle and wherein multiple requested column addressed data words are unloaded by the plurality of output shifters simultaneously in a subsequent single clock cycle, and;
a decoder that requests and receives the multiple requested row addressed data words and the multiple requested column addressed data words from the plurality of output shifters, corrects an error within the multiple requested row addressed data words and the multiple requested column addressed data words, and returns the corrected multiple requested row addressed data words and the corrected multiple requested column addressed data words to the plurality of input shifters, wherein the decoder iteratively requests and returns all row addressed data words within the multidimensional storage array and subsequently requests and returns all column addressed data words within the multidimensional storage array.

2. The multidimensional storage array system of claim 1, wherein multiple column addressed data word segments are physically diagonally arranged within each storage array partition.

3. The multidimensional storage array system of claim 1, wherein the number of rows equals the number of column addressed data word segments within each storage array partition.

4. The multidimensional storage array system of claim 1, wherein multiple data words are loaded to the multidimensional storage array by the plurality of input shifters simultaneously in a single clock cycle.

5. The multidimensional storage array system of claim 1, wherein each input shifter shifts a received first iteration data word by zero positions and shifts a received second iteration data word by a number of positions equal to the number of storage array partitions.

6. The multidimensional storage array system of claim 1, wherein the multidimensional storage array is located within a field programmable gate array (FPGA).

7. The multidimensional storage array system of claim 1, wherein each storage array partition further comprises a plurality of independently addressable storage element clusters, each independently addressable storage element cluster comprising a plurality of storage elements physical arranged in a column.

8. A multidimensional storage array system comprising:
a multidimensional storage array comprising a plurality of storage elements physically arranged in a plurality of rows and a plurality of columns that each store particular bit(s) of a data word;
a plurality of storage array partitions, each storage array partition comprising a plurality of columns, each column comprising a plurality of column orientated storage elements;
a plurality of input shifters, each input shifter associated with a unique storage array partition, wherein each input shifter implements a shift upon received data words and serially loads the shifted data words to the associated storage array partition via a storage array input interface filling the multidimensional storage array with multiple column addressed data words and multiple row addressed data words, wherein row addressed data word segments and column addressed data words are exposed within each storage array partition, and;
a storage array output interface to unload the shifted data words from the multidimensional storage array;
a plurality of output shifters, each output shifter associated with a unique storage array partition, each output shifter unloads from an associated partition and reverses the shift of a requested column addressed data word and unloads from the associate partition and reverses the shift of a plurality of row addressed data word segments associated with a requested row addressed data word; wherein multiple requested column addressed data words are unloaded by the plurality of output shifters simultaneously in a single clock cycle and wherein multiple requested row addressed data words are unloaded by the plurality of output shifters simultaneously in a subsequent single clock cycle, and;
a decoder that requests and receives the multiple requested column addressed data words and the multiple requested row addressed data words from the plurality of output shifters, corrects an error within the multiple requested column addressed data words and the multiple requested row addressed data words, and returns the corrected multiple requested column addressed data words and the multiple requested row addressed data words to the plurality of input shifters, the decoder iteratively requests and returns all column addressed data words within the multidimensional storage array and subsequently requests and returns all row addressed data words within the multidimensional storage array.

9. The multidimensional storage array system of claim 8, wherein multiple row addressed data word segments are physically diagonally arranged within each storage array partition.

10. The multidimensional storage array system of claim 8, wherein the number of columns equals the number of row addressed data word segments within each storage array partition.

11. The multidimensional storage array system of claim 8, wherein multiple data words are loaded to the multidimensional storage array by the plurality of input shifters simultaneously in a single clock cycle.

12. The multidimensional storage array system of claim 8, wherein each input shifter shifts a received first iteration data word by zero positions and shifts a received second iteration data word by a number of positions equal to the number of storage array partitions.

13. The multidimensional storage array system of claim 8, wherein the multidimensional storage array is located within a field programmable gate array (FPGA).

14. The multidimensional storage array system of claim 8, wherein each storage array partition further comprises a plurality of independently addressable storage element clusters, each independently addressable storage element cluster comprising a plurality of storage elements physical arranged in a row.

15. A multidimensional storage array access method comprising:
iteratively receiving, with a plurality of input shifters, a plurality of data words simultaneously in a single clock cycle;
shifting, with each input shifter, a received first iteration data word by zero positions and shifting a received second iteration data word by a number of positions equal to a number of storage array partitions;
loading, with each input shifter, the shifted iteratively received data words to a multidimensional storage array via a storage array input interface to fill the multidimensional storage array with multiple row addressed data words and multiple column addressed data words, the multidimensional storage array comprising a plurality of storage elements physically arranged in a plurality of rows and a plurality of columns and a plurality of storage array partitions, wherein each storage array partition comprises a plurality of rows and each row comprises a plurality of row orientated storage elements, wherein each input shifter loads the shifted iteratively received data words to a particular associated partition, wherein the column addressed data word segments and row addressed data words are exposed within each storage array partition;

unloading, to a plurality of output shifters, multiple requested row addressed data words or multiple requested column addressed data word segments simultaneously in a single clock cycle, wherein each output shifter is associated with a unique storage array partition and unloads from an associated partition and reverses the shift of a requested row addressed data word or unloads from the associated partition and reverses the shift a plurality of column addressed data word segments associated with a requested column addressed data word;

receiving, with a decoder, the multiple requested row addressed data words or multiple requested column addressed data words simultaneously in a single clock cycle;

correcting, with the decoder, an error within the multiple requested row addressed data words or multiple requested column addressed data words, and;

returning, with the decoder, the corrected multiple requested row addressed data words or corrected multiple requested column addressed data words to the plurality of input shifters, wherein the decoder iteratively requests and returns all row addressed data words within the multidimensional storage array and subsequently requests and returns all column addressed data words within the multidimensional storage array.

16. The method of claim 15, wherein multiple column addressed data word segments are physically diagonally arranged within each storage array partition.

17. The method of claim 15, wherein the number of rows equals the number of column addressed data word segments within each storage array partition.

18. The method of claim 15, wherein the multidimensional storage array is located within a field programmable gate array (FPGA).

19. The method of claim 15, wherein each storage array partition further comprises a plurality of independently addressable storage element clusters, each independently addressable storage element cluster comprising a plurality of storage elements physical arranged in a column.

20. The method of claim 15, wherein each input shifter shifts a received third iteration data word by a number of positions equal to double the number of storage array partitions.

* * * * *